(12) United States Patent
Antoku

(10) Patent No.: US 11,313,666 B2
(45) Date of Patent: Apr. 26, 2022

(54) ANGLE SENSOR AND ANGLE SENSOR SYSTEM

(71) Applicant: TDK CORPORATION, Tokyo (JP)

(72) Inventor: Yosuke Antoku, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/000,484

(22) Filed: Aug. 24, 2020

(65) Prior Publication Data

US 2021/0063135 A1    Mar. 4, 2021

(30) Foreign Application Priority Data

Aug. 30, 2019   (JP) .............................. JP2019-157712

(51) Int. Cl.
  *G01B 7/30*    (2006.01)
  *G01D 5/16*    (2006.01)

(52) U.S. Cl.
  CPC ................ *G01B 7/30* (2013.01); *G01D 5/16* (2013.01)

(58) Field of Classification Search
  CPC ..................................... G01B 7/30; G01D 5/16
  See application file for complete search history.

(56) References Cited

U.S. PATENT DOCUMENTS

| 7,719,800 | B2 * | 5/2010 | Hashimoto | B82Y 25/00 360/324 |
| 2009/0315547 | A1 * | 12/2009 | Abwa | G01R 33/02 324/244 |
| 2014/0046625 | A1 * | 2/2014 | Baecher | G01B 7/30 702/151 |
| 2018/0087927 | A1 | 3/2018 | Anagawa et al. | |
| 2020/0166381 | A1 | 5/2020 | Mochizuki | |

* cited by examiner

*Primary Examiner* — Reena Aurora
(74) *Attorney, Agent, or Firm* — Oliff PLC

(57) ABSTRACT

An angle sensor includes a first magnetic sensor that outputs a first signal, a second magnetic sensor that outputs a second signal, and a processor that performs processing for generating an angle detection value. The processing for generating the angle detection value includes first processing for determining a first candidate value of the angle detection value, second processing for performing processing for determining an (n+1)th candidate value either once or more than once while incrementing n in value by one each time, the (n+1)th candidate value being determined by performing second computing processing using the first and second signals, first and second strengths, and an nth candidate value of the angle detection value, where n is an integer of 1 or more, and third processing for assuming the candidate value last determined by the second processing as the angle detection value.

10 Claims, 13 Drawing Sheets

ANGLE SENSOR AND ANGLE SENSOR SYSTEM

BACKGROUND OF THE INVENTION

1. Field of the Invention

The present invention relates to an angle sensor and an angle sensor system for generating an angle detection value having a correspondence with an angle to be detected.

2. Description of the Related Art

In recent years, angle sensors have been widely used in various applications, such as detection of the rotational position of a steering wheel or a power steering motor in an automobile. The angle sensors generate an angle detection value having a correspondence with an angle to be detected. Examples of the angle sensors include a magnetic angle sensor. An angle sensor system using a magnetic angle sensor is typically provided with a magnetic field generation unit for generating a magnetic field to be detected, the direction of which rotates in response to the rotation or linear movement of an object. The magnetic field generation unit is a magnet, for example. The angle to be detected by the magnetic angle sensor has a correspondence with an angle that the direction of the magnetic field to be detected at a reference position forms with respect to a reference direction.

Among known magnetic angle sensors is one that includes a plurality of detection circuits for generating a plurality of detection signals of different phases and generates an angle detection value by performing arithmetic operations using the plurality of detection signals, as disclosed in US 2018/0087927 A1. Each of the plurality of detection circuits detects a magnetic field to be detected. Each of the plurality of detection circuits includes at least one magnetic detection element.

In some magnetic angle sensors, as described in US 2018/0087927 A1, each detection circuit may be subjected not only to a magnetic field to be detected but also to a noise magnetic field other than the magnetic field to be detected. Examples of the noise magnetic field include the earth's magnetic field and a leakage magnetic field from a motor. When subjected to such a noise magnetic field, each detection circuit detects a composite magnetic field of the magnetic field to be detected and the noise magnetic field. When the magnetic field to be detected and the noise magnetic field are in different directions, some error occurs in the angle detection value. The error occurring in the angle detection value will hereinafter be referred to as angular error.

US 2018/0087927 A1 describes a technology to detect the composite magnetic field of the magnetic field to be detected and the noise magnetic field at a plurality of detection positions and use the detection information to generate an angle detection value with reduced error caused by the noise magnetic field. The magnetic field to be detected has different strengths at the plurality of detection positions.

In the technology described in US 2018/0087927 A1, the noise magnetic field is assumed to have a strength sufficiently lower than that of the magnetic field to be detected. For such a technology to enable sufficient reduction of the angular error caused by the noise magnetic field even if the strength of the noise magnetic field is higher, an additional approach is therefore needed.

SUMMARY OF THE INVENTION

It is an object of the present invention to provide an angle sensor and an angle sensor system that effectively reduce angular error caused by a noise magnetic field by using two magnetic sensors.

An angle sensor of the present invention is configured to generate an angle detection value having a correspondence with an angle to be detected. The angle sensor according to the present invention includes: a first magnetic sensor that detects a first composite magnetic field at a first detection position, and outputs at least one first signal having a correspondence with an angle that a direction of the first composite magnetic field forms with respect to a reference direction, the first composite magnetic field being a composite magnetic field of a magnetic field to be detected and a noise magnetic field other than the magnetic field to be detected; a second magnetic sensor that detects a second composite magnetic field at a second detection position different from the first detection position, and outputs at least one second signal having a correspondence with an angle that a direction of the second composite magnetic field forms with respect to the reference direction, the second composite magnetic field being a composite magnetic field of the magnetic field to be detected and the noise magnetic field; and a processor that obtains the at least one first signal and the at least one second signal, and performs processing for generating the angle detection value.

At the first and second detection positions, the direction of the magnetic field to be detected changes with the angle to be detected. The magnetic field to be detected has a first strength at the first detection position. The magnetic field to be detected has a second strength different from the first strength at the second detection position.

The processing for generating the angle detection value includes first processing for determining a first candidate value of the angle detection value by performing first computing processing using the at least one first signal, the at least one second signal, and the first and second strengths, second processing for performing processing for determining an (n+1)th candidate value either once or more than once while incrementing n in value by one each time, the (n+1)th candidate value being determined by performing second computing processing using the at least one first signal, the at least one second signal, the first and second strengths, and an nth candidate value of the angle detection value, where n is an integer of 1 or more, and third processing for assuming the candidate value last determined by the second processing as the angle detection value.

In the angle sensor according to the present invention, the at least one first signal may be a signal including information about a first initial angle detection value indicating the angle that the direction of the first composite magnetic field forms with respect to the reference direction. The at least one second signal may be a signal including information about a second initial angle detection value indicating the angle that the direction of the second composite magnetic field forms with respect to the reference direction. In such a case, the first computing processing may be processing for calculating the first candidate value by substituting the first and second initial angle detection values and a ratio of the first strength to the second strength into a first function for determining the angle detection value.

Suppose that the at least one first signal is a signal including the information about the first initial angle detection value and the at least one second signal is a signal including the information about the second initial angle detection value. In such a case, the second computing processing may be processing for calculating the (n+1)th candidate value by substituting the first and second initial angle detection values, the ratio of the first strength to the second strength, and the nth candidate value into a second function for determining the angle detection value. Here, the second function may include a coefficient expressed by an equation using the nth candidate value of the angle detection value and at least one parameter. The at least one parameter may include a first parameter representing a ratio of a strength of the noise magnetic field to the first strength, a second parameter representing a ratio of the strength of the noise magnetic field to the second strength, and a third parameter representing an angle that a direction of the noise magnetic field forms with respect to the reference direction. The processor may determine the at least one parameter by using a plurality of pairs of first and second initial angle detection values obtained when the direction of the magnetic field to be detected makes at least one rotation in a predetermined direction of rotation, and a plurality of first candidate values corresponding to the plurality of pairs or a plurality of angle detection values corresponding to the plurality of pairs.

In the angle sensor according to the present invention, the at least one first signal may include two signals having a correspondence with a cosine and a sine of the angle that the direction of the first composite magnetic field forms with respect to the reference direction. The at least one second signal may include two signals having a correspondence with a cosine and a sine of the angle that the direction of the second composite magnetic field forms with respect to the reference direction.

An angle sensor system of the present invention includes the angle sensor of the present invention and a magnetic field generation unit for generating a magnetic field to be detected. The first and second detection positions are at mutually different distances from the magnetic field generation unit.

In the angle sensor system of the present invention, the first and second detection positions may be mutually different positions on an imaginary straight line passing through the magnetic field generation unit.

In the angle sensor and the angle sensor system of the present invention, the processing for determining a new candidate value by using a candidate value of the angle detection value is performed once or more, and the candidate value last determined is assumed as the angle detection value. According to the present invention, an angular error caused by the noise magnetic field can thereby be effectively reduced.

Other and further objects, features and advantages of the present invention will appear more fully from the following description.

DETAILED DESCRIPTION OF THE PREFERRED EMBODIMENTS

Figure 1:
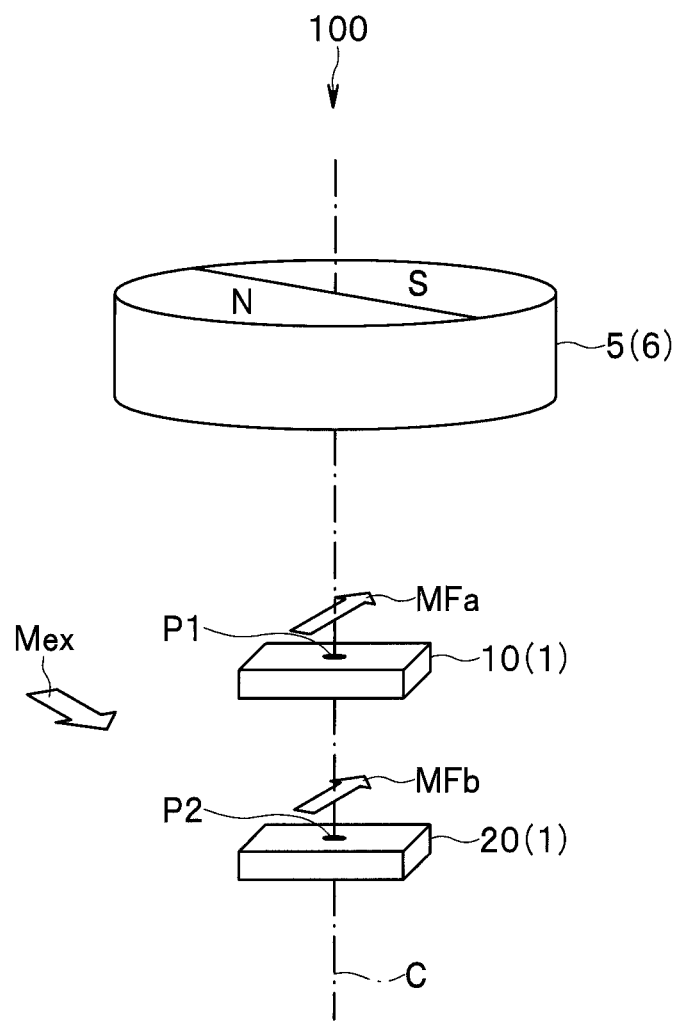
FIG. 1 is a perspective view showing a schematic configuration of an angle sensor system according to an embodiment of the invention.

Preferred embodiment of the present invention will now be described in detail with reference to the drawings. First, reference is made to FIG. 1 to describe the general configuration of an angle sensor system according to the embodiment of the invention. The angle sensor system 100 according to the embodiment includes an angle sensor 1 according to the embodiment and a magnetic field generation unit 5. The angle sensor 1 is a magnetic angle sensor, in particular.

The magnetic field generation unit 5 generates a magnetic field to be detected related to an angle to be detected. The magnetic field generation unit 5 of the present embodiment is a magnet 6 of a cylindrical shape. The magnet 6 has an N pole and an S pole that are arranged symmetrically with respect to an imaginary plane including the central axis of the cylindrical shape. The magnet 6 rotates about the central axis of the cylindrical shape. Consequently, the direction of the magnetic field to be detected generated by the magnet 6 rotates about a center of rotation C including the central axis of the cylindrical shape.

Hereinafter, the angle to be detected will be referred to as a detection-target angle, and denoted by a symbol θ. The detection-target angle θ in the present embodiment is an angle corresponding to the rotational position of the magnet 6.

The angle sensor 1 is configured to detect the magnetic field to be detected and to generate an angle detection value θs having a correspondence with the detection-target angle θ. Hereinafter, an angle that the direction of the magnetic field to be detected at a reference position forms with respect to a reference direction DR will be referred to as a rotating field angle, and denoted by a symbol θM. The rotating field angle θM has a correspondence with the detection-target angle θ. The rotating field angle θM is identical with the detection-target angle θ if the magnet 6 generates an ideal rotating magnetic field. In the present embodiment, the rotating field angle θM is assumed to be identical with the detection-target angle θ.

The reference position is located within a reference plane. As used herein, the reference plane refers to an imaginary plane parallel to an end face of the magnet 6. In the reference plane, the direction of the magnetic field to be detected generated by the magnet 6 rotates about the reference position. The reference direction DR is located within the reference plane and intersects the reference position. In the following description, the direction of the magnetic field to be detected at the reference position refers to a direction located within the reference plane.

The angle detection value θs has a correspondence with the rotating field angle θM. As mentioned above, the rotating field angle θM has a correspondence with the detection-target angle θ. The angle detection value θs thus has a correspondence with the detection-target angle θ.

The angle sensor 1 includes a first magnetic sensor 10 and a second magnetic sensor 20. The first and second magnetic sensors 10 and 20 are opposed to the end face of the magnet 6. The first magnetic sensor 10 detects a first composite magnetic field MF1 at a first detection position P1. The first composite magnetic field MF1 is a composite magnetic field of the magnetic field to be detected and a noise magnetic field Mex other than the magnetic field to be detected. The second magnetic sensor 20 detects a second composite magnetic field MF2 at a second detection position P2 different from the first detection position P1. The second composite magnetic field MF2 is a composite magnetic field of the magnetic field to be detected and the noise magnetic field Mex other than the magnetic field to be detected.

The first and second detection positions P1 and P2 are at different distances from the magnetic field generation unit 5. The first detection position P1 and the second detection position P2 are mutually different positions on an imaginary straight line passing through the magnetic field generation unit 5. The imaginary straight line may or may not coincide with the center of rotation C. FIG. 1 illustrates the former case. In the present embodiment, the second detection position P2 is at a greater distance from the magnetic field generation unit 5 than the first detection position P1.

Hereinafter, the magnetic field to be detected at the first detection position P1 will be referred to as a first partial magnetic field MFa, and the magnetic field to be detected at the second detection position P2 will be referred to as a second partial magnetic field MFb. The first composite magnetic field MF1 is the composite magnetic field of the first partial magnetic field MFa and the noise magnetic field Mex. The second composite magnetic field MF2 is the composite magnetic field of the second partial magnetic field MFb and the noise magnetic field Mex. The directions of the first and second partial magnetic fields MFa and MFb change with the detection-target angle θ and the rotating field angle θM. In the present embodiment, the directions of the first and second partial magnetic fields MFa and MFb are parallel to the reference plane. For the sake of convenience,  in FIG. 1, the first partial magnetic field MFa is shown at a position away from the first detection position P1. Similarly, for the sake of convenience, in FIG. 1, the second partial magnetic field MFb is shown at a position away from the second detection position P2. The directions of the first and second partial magnetic fields MFa and MFb may be slightly different from a direction parallel to the reference plane.

The first partial magnetic field MFa has a first strength B1. The second partial magnetic field MFb has a second strength B2. The first and second strengths B1 and B2 are different since the first and second detection positions P1 and P2 are different.

The direction and strength of the noise magnetic field Mex at the second detection position P2 are respectively the same as the direction and strength of the noise magnetic field Mex at the first detection position P1. The noise magnetic field Mex may have a temporally constant direction and strength. The noise magnetic field Mex may vary temporally periodically in direction and strength, for example, in synchronization with the rotation of a motor.

The angle sensor system 100 according to the present embodiment may have a different configuration than that shown in FIG. 1. For example, the magnetic field generation unit 5 and the first and second magnetic sensors 10 and 20 arranged as shown in FIG. 1 may be configured so that: the first and second magnetic sensors 10 and 20 rotate while the magnetic field generation unit 5 is fixed; the magnetic field generation unit 5 and the magnetic sensors 10, 20 rotate in mutually opposite directions; or the magnetic field generation unit 5 and the magnetic sensors 10, 20 rotate in the same direction with mutually different angular velocities.

Figure 2:
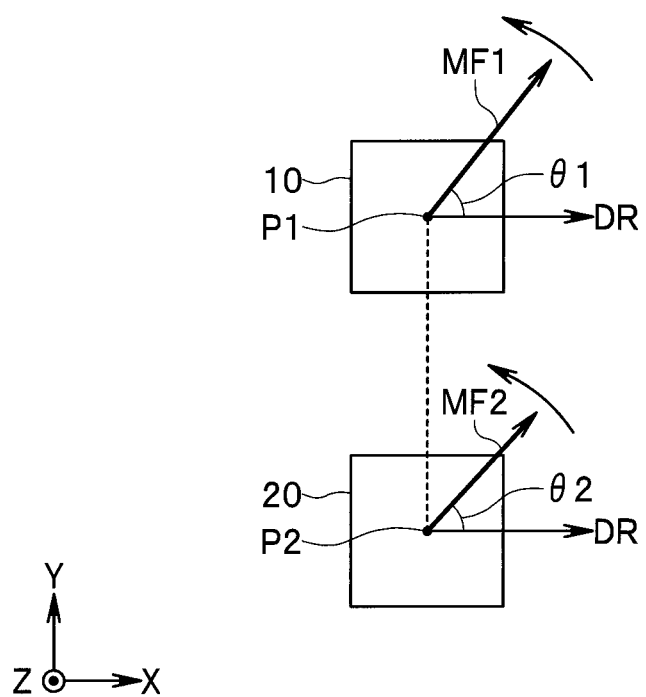
FIG. 2 is an explanatory diagram illustrating the definitions of directions and angles used in the embodiment of the invention.

Definitions of directions and angles used in the present embodiment will now be described with reference to FIG. 1 and FIG. 2. First, Z direction is the direction parallel to the center of rotation C shown in FIG. 1 and upward in FIG. 1. FIG. 2 illustrates the Z direction as the direction out of the plane of FIG. 2. Next, X and Y directions are two directions that are perpendicular to the Z direction and orthogonal to each other. FIG. 2 illustrates the X direction as the rightward direction, and the Y direction as the upward direction. Further, −X direction is the direction opposite to the X direction, and −Y direction is the direction opposite to the Y direction.

The rotating field angle θM is expressed with respect to the reference direction DR. In the present embodiment, the X direction is the reference direction DR.

Assume that the directions of the first and second composite magnetic fields MF1 and MF2 both rotate counterclockwise in FIG. 2. As shown in FIG. 2, θ1 represents an angle that the direction of the first composite magnetic field MF1 forms with respect to the reference direction DR, and θ2 represents an angle that the direction of the second composite magnetic field MF2 forms with respect to the reference direction DR. The angles θ1 and θ2 are expressed in positive values when seen counterclockwise from the reference direction DR, and in negative values when seen clockwise from the reference direction DR.

The main component of the first composite magnetic field MF1 is the first partial magnetic field MFa. The main component of the second composite magnetic field MF2 is the second partial magnetic field MFb. In the following description, the directions of the first and second partial magnetic fields MFa and MFb are assumed to be identical with the direction of the magnetic field to be detected at the reference position. In this case, the respective angles that the first and second partial magnetic fields MFa and MFb form with respect to the reference direction DR are equal to the rotating field angle θM. The positive and negative signs of those angles are defined in the same manner as those of the angles θ1 and θ2.

As long as the above-described relationship between the first and second partial magnetic fields MFa and MFb and the magnetic field to be detected at the reference position is satisfied, the reference position may coincide with the first detection position P1 or the second detection position P2, or may be any position different therefrom.

Figure 3:
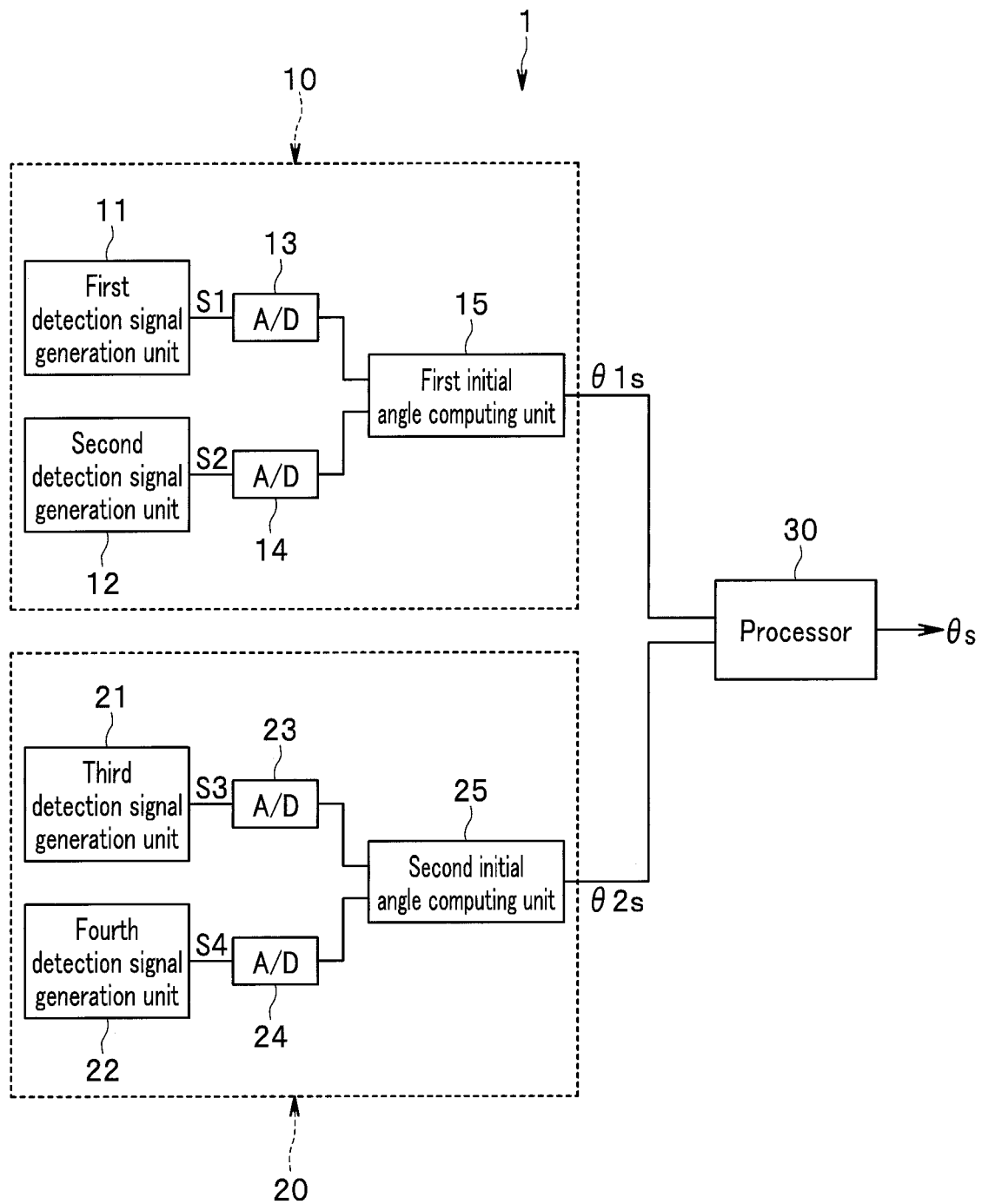
FIG. 3 is a block diagram illustrating the configuration of an angle sensor according to the embodiment of the invention.

Reference is now made to FIG. 3 to describe the configuration of the angle sensor 1 in detail. FIG. 3 is a block diagram illustrating the configuration of the angle sensor 1. As previously mentioned, the angle sensor 1 includes the first and second magnetic sensors 10 and 20. The first magnetic sensor 10 outputs at least one first signal having a correspondence with the angle θ1 that the direction of the first composite magnetic field MF1 forms with respect to the reference direction DR. The second magnetic sensor 20 outputs at least one second signal having a correspondence with the angle θ2 that the direction of the second composite magnetic field MF2 forms with respect to the reference direction DR.

The first magnetic sensor 10 includes a first detection signal generation unit 11 and a second detection signal generation unit 12. The first detection signal generation unit 11 generates a first detection signal S1 having a correspondence with the cosine of the angle θ1. The first detection signal S1 may have a correspondence with the strength of a component of the first composite magnetic field MF1 in the X direction. The second detection signal generation unit 12 generates a second detection signal S2 having a correspondence with the sine of the angle θ1. The second detection signal S2 may have a correspondence with the strength of a component of the first composite magnetic field MF1 in the Y direction.

The at least one first signal may be a signal including information about a first initial angle detection value θ1s indicating the angle θ1. The at least one first signal may be two signals having a correspondence with the cosine and sine of the angle θ1, i.e., the first and second detection signals S1 and S2. The following description will be given by using a case where the at least one first signal is a signal including the information about the first initial angle detection value θ1s as an example.

The first initial angle detection value θ1s is generated on the basis of the first and second detection signals S1 and S2. The first magnetic sensor 10 further includes analog-to-digital converters (hereinafter, □A/D converters□) 13 and 14, and a first initial angle computing unit 15. The A/D converters 13 and 14 respectively convert the first and second detection signals S1 and S2 into digital signals. The first initial angle computing unit 15 determines the first initial angle detection value θ1s by performing an operation using the first and second detection signals S1 and S2, which have been converted into digital signals by the A/D converters 13 and 14, respectively. The first initial angle computing unit 15 outputs a signal including information about the determined first initial angle detection value θ1s, i.e., the first signal. The first initial angle computing unit 15 can be implemented by an application-specific integrated circuit (ASIC), for example. The first signal may be a digital signal output from the ASIC.

The second magnetic sensor 20 includes a third detection signal generation unit 21 and a fourth detection signal generation unit 22. The third detection signal generation unit 21 generates a third detection signal S3 having a correspondence with the cosine of the angle θ2. The third detection signal S3 may have a correspondence with the strength of a component of the second composite magnetic field MF2 in the X direction. The fourth detection signal generation unit 22 generates a fourth detection signal S4 having a correspondence with the sine of the angle θ2. The fourth detection signal S4 may have a correspondence with the strength of a component of the second composite magnetic field MF2 in the Y direction.

The at least one second signal may be a signal including information about a second initial angle detection value θ2s indicating the angle θ2. The at least one second signal may be two signals having a correspondence with the cosine and sine of the angle θ2, i.e., the third and fourth detection signals S3 and S4. The following description will be given by using a case where the at least one second signal is a signal including the information about the second initial angle detection value θ2s as an example.

The second initial angle detection value θ2s is generated on the basis of the third and fourth detection signals S3 and S4. The second magnetic sensor 20 further includes A/D converters 23 and 24, and a second initial angle computing unit 25. The A/D converters 23 and 24 respectively convert the third and fourth detection signals S3 and S4 into digital signals. The second initial angle computing unit 25 determines the second initial angle detection value θ2s by performing an operation using the third and fourth detection signals S3 and S4, which have been converted into digital signals by the A/D converters 23 and 24, respectively. The second initial angle computing unit 25 outputs a signal including information about the determined second initial angle detection value θ2s, i.e., the second signal. The second initial angle computing unit 25 can be implemented by an ASIC, for example. The second signal may be a digital signal output from the ASIC.

Each of the first to fourth detection signal generation units 11, 12, 21 and 22 includes at least one magnetic detection element. The at least one magnetic detection element may include at least one magnetoresistive element. The magnetoresistive element may be a giant magnetoresistive (GMR) element, a tunneling magnetoresistive (TMR) element, or an anisotropic magnetoresistive (AMR) element. The at least one magnetic detection element may further include at least one element other than a magnetoresistive element and configured to detect a magnetic field, such as a Hall element.

As the direction of the magnetic field to be detected rotates with a predetermined period T, the rotating field angle θM varies with the predetermined period T. In this case, all the first to fourth detection signals S1 to S4 vary periodically with the period T. The first detection signal S1 and the third detection signal S3 have the same phase. The second detection signal S2 and the fourth detection signal S4 have the same phase. The phase of the second detection signal S2 is different from the phase of the first detection signal S1 by an odd number of times ¼ the period T. The phase of the fourth detection signal S4 is different from the phase of the third detection signal S3 by an odd number of times ¼ the period T. In the light of the production accuracy of the magnetic detection elements or other factors, the relationships among the phases of the detection signals may be slightly different from the above-described relationships.

The angle sensor 1 further includes a processor 30. The processor 30 obtains the at least one first signal and the at least one second signal from the first and second magnetic sensors 10 and 20, and performs processing for generating the angle detection value θs. The processor 30 can be implemented by an application-specific integrated circuit (ASIC) or a microcomputer, for example. The configuration of the processor 30 and the method for generating the angle detection value θs will be described later.

Figure 5:
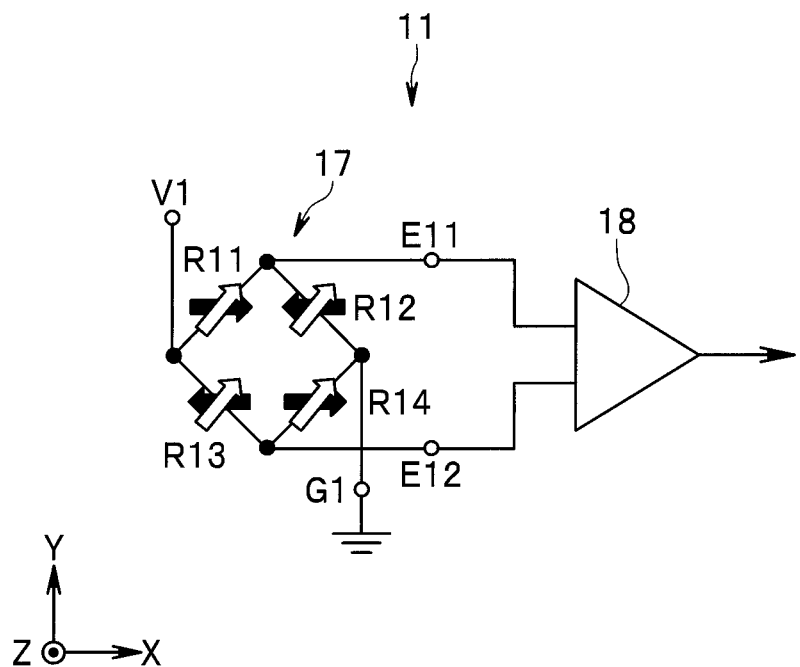
FIG. 5 is a circuit diagram illustrating an example configuration of a first detection signal generation unit of the embodiment of the invention.

The configuration of the first to fourth detection signal generation units 11, 12, 21 and 22 will now be described. FIG. 5 illustrates a specific example of configuration of the first detection signal generation unit 11. In this example, the first detection signal generation unit 11 includes a Wheatstone bridge circuit 17 and a difference detector 18. The Wheatstone bridge circuit 17 includes four magnetic detection elements R11, R12, R13 and R14, a power supply port V1, a ground port G1, and two output ports E11 and E12. The magnetic detection element R11 is provided between the power supply port V1 and the output port E11. The magnetic detection element R12 is provided between the output port E11 and the ground port G1. The magnetic detection element R13 is provided between the power supply port V1 and the output port E12. The magnetic detection element R14 is provided between the output port E12 and the ground port G1. A power supply voltage of predetermined magnitude is applied to the power supply port V1. The ground port G1 is connected to the ground.

The third detection signal generation unit 21 has the same configuration as the first detection signal generation unit 11. Thus, in the following description, components of the third detection signal generation unit 21 are denoted by the same reference signs as those used for the components of the first detection signal generation unit 11.

Figure 6:
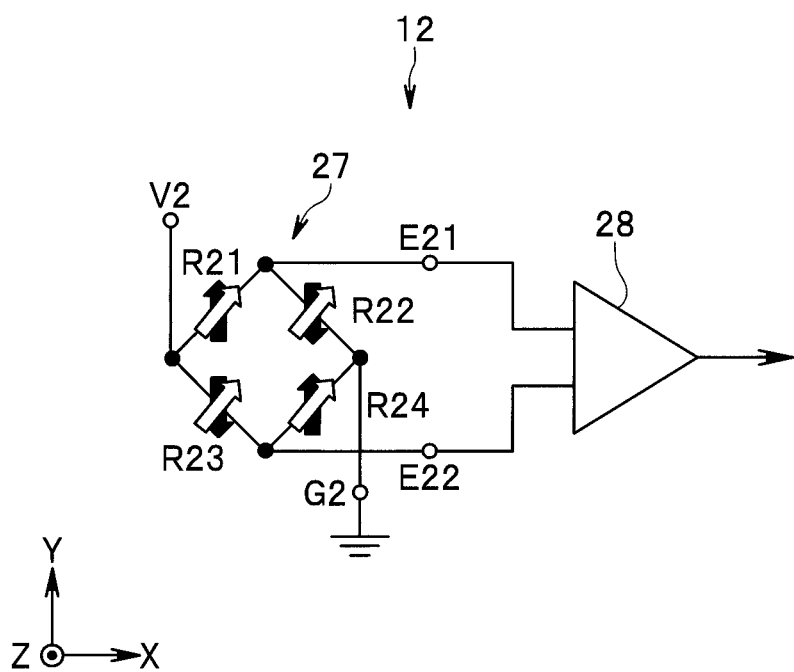
FIG. 6 is a circuit diagram illustrating an example configuration of a second detection signal generation unit of the embodiment of the invention.

FIG. 6 illustrates a specific example of configuration of the second detection signal generation unit 12. In this example, the second detection signal generation unit 12 includes a Wheatstone bridge circuit 27 and a difference detector 28. The Wheatstone bridge circuit 27 includes four magnetic detection elements R21, R22, R23 and R24, a power supply port V2, a ground port G2, and two output ports E21 and E22. The magnetic detection element R21 is provided between the power supply port V2 and the output port E21. The magnetic detection element R22 is provided between the output port E21 and the ground port G2. The magnetic detection element R23 is provided between the power supply port V2 and the output port E22. The magnetic detection element R24 is provided between the output port E22 and the ground port G2. A power supply voltage of predetermined magnitude is applied to the power supply port V2. The ground port G2 is connected to the ground.

The fourth detection signal generation unit 22 has the same configuration as the second detection signal generation unit 12. Thus, in the following description, components of the fourth detection signal generation unit 22 are denoted by the same reference signs as those used for the components of the second detection signal generation unit 12.

In the present embodiment, each of the magnetic detection elements R11 to R14 and R21 to R24 includes a plurality of magnetoresistive (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction changes with the direction of the magnetic field to be detected, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The resistance of the spin-valve MR element changes with the angle that the magnetization direction of the free layer forms with respect to the magnetization direction of the magnetization pinned layer. The resistance of the spin-valve MR element is at its minimum value when the foregoing angle is 0°, and at its maximum value when the foregoing angle is 180°. In FIG. 5 and FIG. 6, the filled arrows indicate the magnetization directions of the magnetization pinned layers of the MR elements, and the hollow arrows indicate the magnetization directions of the free layers of the MR elements.

In the first detection signal generation unit 11, the magnetization pinned layers of the MR elements included in the magnetic detection elements R11 and R14 are magnetized in the X direction, and the magnetization pinned layers of the MR elements included in the magnetic detection elements R12 and R13 are magnetized in the −X direction. In this case, the potential difference between the output ports E11 and E12 changes with the cosine of the angle θ1. The difference detector 18 outputs a signal corresponding to the potential difference between the output ports E11 and E12 as the first detection signal S1. The first detection signal S1 thus has a correspondence with the cosine of the angle θ1.

In the second detection signal generation unit 12, the magnetization pinned layers of the MR elements included in the magnetic detection elements R21 and R24 are magnetized in the Y direction, and the magnetization pinned layers of the MR elements included in the magnetic detection elements R22 and R23 are magnetized in the −Y direction. In this case, the potential difference between the output ports E21 and E22 changes with the sine of the angle θ1. The difference detector 28 outputs a signal corresponding to the potential difference between the output ports E21 and E22 as the second detection signal S2. The second detection signal S2 thus has a correspondence with the sine of the angle θ1.

In the third detection signal generation unit 21, the potential difference between the output ports E11 and E12 changes with the cosine of the angle θ2. The difference detector 18 outputs a signal corresponding to the potential difference between the output ports E11 and E12 as the third detection signal S3. The third detection signal S3 thus has a correspondence with the cosine of the angle θ2.

In the fourth detection signal generation unit 22, the potential difference between the output ports E21 and E22 changes with the sine of the angle θ2. The difference detector 28 outputs a signal corresponding to the potential difference between the output ports E21 and E22 as the fourth detection signal S4. The fourth detection signal S4 thus has a correspondence with the sine of the angle θ2.

In the light of the production accuracy of the MR elements and other factors, the magnetization directions of the magnetization pinned layers of the plurality of MR elements in the detection signal generation units 11, 12, 21 and 22 may be slightly different from the above-described directions.

Figure 7:
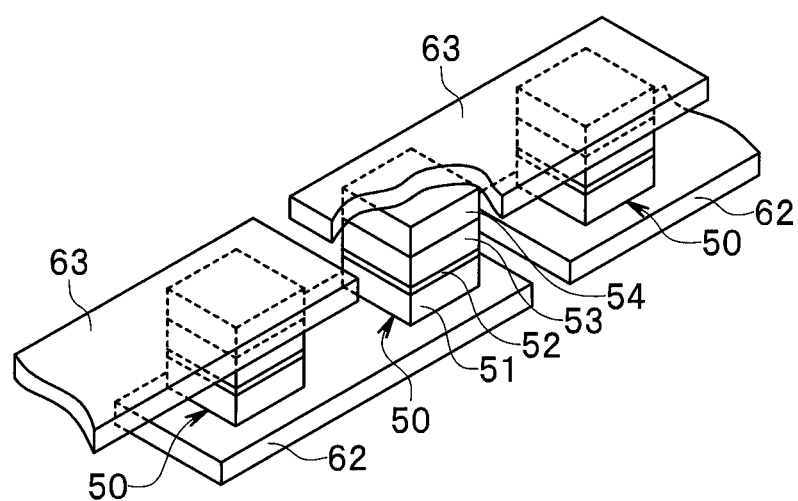
FIG. 7 is a perspective view of a portion of a magnetic detection element shown in FIG. 5 and FIG. 6.

An example configuration of the magnetic detection elements will now be described with reference to FIG. 7. FIG. 7 is a perspective view of part of a magnetic detection element in the detection signal generation units 11 and 12 shown in FIG. 5 and FIG. 6. In this example, the magnetic detection element includes a plurality of lower electrodes 62, a plurality of MR elements 50 and a plurality of upper electrodes 63. The lower electrodes 62 are arranged on a substrate (not illustrated). The lower electrodes 62 each have a long slender shape. Every two lower electrodes 62 that are adjacent to each other in the longitudinal direction of the lower electrodes 62 have a gap therebetween. As shown in FIG. 7, MR elements 50 are provided on the top surface of the lower electrode 62 at positions near opposite ends in the longitudinal direction. Each MR element 50 includes a free layer 51, a nonmagnetic layer 52, a magnetization pinned layer 53, and an antiferromagnetic layer 54 which are stacked in this order, from closest to farthest from the lower electrode 62. The free layer 51 is electrically connected to the lower electrode 62. The antiferromagnetic layer 54 is formed of an antiferromagnetic material, and is in exchange coupling with the magnetization pinned layer 53 to thereby pin the magnetization direction of the magnetization pinned layer 53. The upper electrodes 63 are arranged over the MR elements 50. Each upper electrode 63 has a long slender shape, and establishes electrical connection between the respective antiferromagnetic layers 54 of two adjacent MR elements 50 that are arranged on two lower electrodes 62 adjacent in the longitudinal direction of the lower electrodes 62. With such a configuration, the MR elements 50 in the magnetic detection element shown in FIG. 7 are connected in series by the upper and lower electrodes 63 and 62.

It should be appreciated that the layers 51 to 54 of the MR elements 50 may be stacked in the reverse order to that shown in FIG. 7. Further, the MR element 50 may be configured without the antiferromagnetic layer 54. The configuration may be such that, for example, the antiferromagnetic layer 54 and the magnetization pinned layer 53 are replaced with a magnetization pinned layer of an artificial antiferromagnetic structure, which includes two ferromagnetic layers and a nonmagnetic metal layer interposed between the two ferromagnetic layers.

Next, a method for computing the first and second initial angle detection values θ1s and θ2s will be described. The first initial angle computing unit 15 of the first magnetic sensor 10 calculates θ1s, for example, by the following Eq. (1):

$$\theta 1s = atan(S2/S1) \quad (1)$$

"atan" represents arctangent.

For θ1s ranging from 0° to less than 360°, Eq. (1) yields two solutions of θ1s that are 180° different in value. Which of the two solutions of θ1s in Eq. (1) is the true value of θ1s can be determined in accordance with the combination of the signs of S1 and S2. The first initial angle computing unit 15 determines θ1s within the range of 0° to less than 360° in accordance with Eq. (1) and the determination on the combination of the signs of S1 and S2.

The second initial angle computing unit 25 of the second magnetic sensor 20 calculates θ2s, for example, by the following Eq. (2):

$$\theta 2s = atan(S4/S3) \quad (2)$$

For θ2s ranging from 0° to less than 360°, Eq. (2) yields two solutions of θ2s that are 180° different in value. Which of the two solutions of θ2s in Eq. (2) is the true value of θ2s can be determined in accordance with the combination of the signs of S3 and S4. The second initial angle computing unit 25 determines θ2s within the range of 0° to less than 360° in accordance with Eq. (2) and the determination on the combination of the signs of S3 and S4.

Next, a method for computing the angle detection value θs will be described. To begin with, a description will be given of the relationship between the angles θ1, θ2 and the rotating field angle θM. If there is no noise magnetic field Mex, the angle θ1 is equal to the rotating field angle θM. If there is a noise magnetic field Mex, the direction of the first composite magnetic field MF1 can deviate from that of the first partial magnetic field MFa, so that the angle θ1 can become different from the rotating field angle θM in value. A difference between the angle θ1 and the rotating field angle θM will hereinafter be referred to as an angular error of the angle θ1 and denoted by the symbol ε1. The angular error ε1 is caused by the noise magnetic field Mex.

Similarly, if there is no noise magnetic field Mex, the angle θ2 is equal to the rotating field angle θM. If there is a noise magnetic field Mex, the direction of the second composite magnetic field MF2 can deviate from that of the second partial magnetic field MFb, so that the angle θ2 can become different from the rotating field angle θM in value. A difference between the angle θ2 and the rotating field angle θM will hereinafter be referred to as an angular error of the angle θ2 and denoted by the symbol ε2. The angular error ε2 is caused by the noise magnetic field Mex.

Figure 8A:
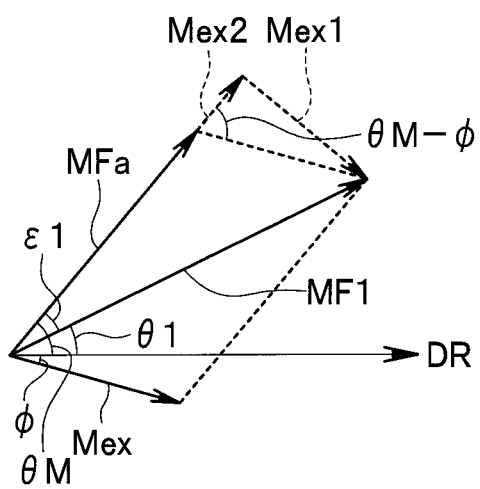
FIG. 8A is an explanatory diagram schematically illustrating the relationship between a first composite magnetic field and a noise magnetic field in the embodiment of the invention.
Figure 8B:
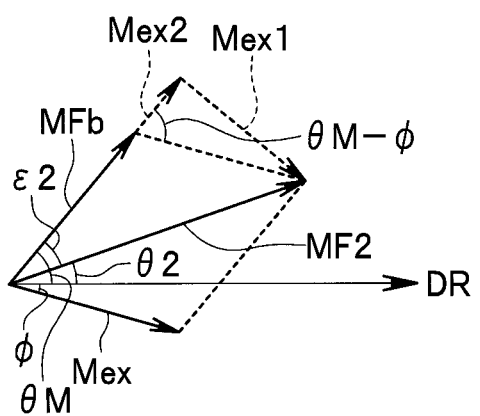
FIG. 8B is an explanatory diagram schematically illustrating the relationship between a second composite magnetic field and the noise magnetic field in the embodiment of the invention.

FIG. 8A and FIG. 8B are explanatory diagrams schematically illustrating the relationship between the first and second composite magnetic fields MF1, MF2 and the noise magnetic field Mex. FIG. 8A illustrates the relationship between the first composite magnetic field MF1 and the noise magnetic field Mex. FIG. 8B illustrates the relationship between the second composite magnetic field MF2 and the noise magnetic field Mex. As shown in FIG. 8A and FIG. 8B, the directions of the first and second composite magnetic fields MF1 and MF2 deviate from the directions of the first and second partial magnetic fields MFa and MFb, respectively, due to the effect of the noise magnetic field Mex.

As shown in FIG. 8A, the angle θ1 is expressible by using the rotating field angle θM and the angular error ε1 of the angle θ1. As shown in FIG. 8B, the angle θ2 is expressible by using the rotating field angle θM and the angular error ε2 of the angle θ2. Specifically, the angles θ1 and θ2 are expressible by the following Eqs. (3) and (4), respectively.

$$\theta 1 = \theta M - \varepsilon 1 \quad (3)$$

$$\theta 2 = \theta M - \varepsilon 2 \quad (4)$$

As shown in FIG. 8A and FIG. 8B, φ represents an angle that the direction of the noise magnetic field Mex forms with respect to the reference direction DR. The angle φ is expressed in positive values when seen counterclockwise from the reference direction DR, and in negative values when seen clockwise from the reference direction DR. FIGS. 8A and 8B show an example where the angle φ has a negative value less than 0° and greater than −90°.

Now, the noise magnetic field Mex will be discussed in terms of first to third components separately. A first component of the noise magnetic field Mex is a component in a direction parallel to an XY plane and orthogonal to the directions of the first and second partial magnetic fields MFa and MFb. A second component of the noise magnetic field Mex is a component in a direction parallel to the directions of the first and second partial magnetic fields MFa and MFb. A third component of the noise magnetic field Mex is a component in a direction perpendicular to the XY plane. The third component does not affect the angles θ1 and θ2. The first and second components of the noise magnetic field Mex will hereinafter be denoted by the symbols Mex1 and Mex2, respectively. The strength of the noise magnetic field Mex will be denoted by Bex, the strength of the first component Mex1 by Bex1, and the strength of the second component Mex2 by Bex2. Bex1 and Bex2 can be expressed by the following Eqs. (5) and (6), respectively:

$$Bex1 = Bex*\sin(\theta M - \phi)) \quad (5)$$

$$Bex2 = Bex*\cos(\theta M - \phi) \quad (6)$$

Suppose that the strength Bex of the noise magnetic field Mex is sufficiently low compared to the first strength B1 of the first partial magnetic field MFa and the second strength B2 of the second partial magnetic field MFb. In such a case, the effect of the second component Mex2 on the deviations in the directions of the first and second composite magnetic fields MF1 and MF2 can be ignored. The relationship between the angles θ1 and θ2 and the rotating field angle θM will now be described separately for a case where the effect of the second component Mex2 is ignored and for a case where the effect of the second component Mex2 is not ignored.

Initially, the case where the effect of the second component Mex2 is ignored will be described. In such a case, the angular error ε1 of the angle θ1 is given by the arctangent of the ratio of the strength Bex1 of the first component Mex1 to the first strength B1 of the first partial magnetic field MFa, or atan(Bex1/B1). The angular error ε2 of the angle θ2 is given by the arctangent of the ratio of the strength Bex1 of the first component Mex1 to the second strength B2 of the second partial magnetic field MFb, or atan(Bex1/B2). The angles θ1 and θ2 can thus be expressed by the following Eqs. (7) and (8), respectively:

$$\theta 1 = \theta M - \text{atan}(Bex1/B1) \quad (7)$$

$$\theta 2 = \theta M - \text{atan}(Bex1/B2) \quad (8)$$

If x (in units of rad) is sufficiently small, atan(x) can be approximated by x. As described above, if the effect of the second component Mex2 is ignored, the strength Bex of the noise magnetic field Mex is sufficiently low compared to the first and second strengths B1 and B2. The strength Bex1 of the first component Mex1 is thus also sufficiently low compared to the first and second strengths B1 and B2. Therefore, atan(Bex1/B1) and atan(Bex1/B2) can be approximated by Bex1/B1 and Bex1/B2, respectively. Applying the approximation to Eq. (7) and rearranging the equation allows Bex1 to be expressed in Eq. (9) below.

$$Bex1 = -B1*(\theta 1 - \theta M) \quad (9)$$

Applying the above-described approximation to Eq. (8) to rearrange the equation and further substituting Eq. (9) into the rearranged equation yields Eq. (10) below.

$$\theta 2 = \theta M + B1*(\theta 1 - \theta M)/B2 \quad (10)$$

Rearranging Eq. (10) allows the rotating field angle θM to be expressed in Eq. (11) below.

$$\theta M = \{\theta 2 - (B1/B2)*\theta 1\}/\{1 - (B1/B2)\} \quad (11)$$

B1/B2 will be defined as C1. Using C1, Eq. (11) can be expressed by the following Eq. (12):

$$\theta M = (\theta 2 - C1*\theta 1)/(1 - C1) \quad (12)$$

Next, the case where the effect of the second component Mex2 is not ignored will be described. In such a case, the angular error ε1 of the angle θ1 is given by the arctangent of the ratio of the strength Bex1 of the first component Mex1 to the strength of the composite magnetic field of the first partial magnetic field MFa and the second component Mex2. The angular error ε2 of the angle θ2 is given by the arctangent of the ratio of the strength Bex1 of the first component Mex1 to the strength of the composite magnetic field of the second partial magnetic field MFb and the second component Mex2. Specifically, the angular errors ε1 and ε2 can be expressed by the following Eqs. (13) and (14), respectively:

$$\varepsilon 1 = \text{atan}\{Bex1/(B1 + Bex2)\} \quad (13)$$

$$\varepsilon 2 = \text{atan}\{Bex1/(B2 + Bex2)\} \quad (14)$$

Substituting Eqs. (5) and (6), and Eq. (13) to which the foregoing atan(x) approximation is applied into Eq. (3) yields the following Eq. (15):

$$\theta 1 = \theta M - Bex1/(B1 + Bex2) \quad (15)$$

$$= \theta M - Bex*\sin(\theta M - \phi)/(B1 + Bex*\cos(\theta M - \phi))$$

$$= \theta M - Bex/B1*\sin(\theta M - \phi)/(1 + Bex/B1*\cos(\theta M - \phi))$$

Similarly, substituting Eqs. (5) and (6), and Eq. (14) to which the foregoing atan(x) approximation is applied into Eq. (4) yields the following Eq. (16):

$$\theta 2 = \theta M - Bex1/(B2 + Bex2) \quad (16)$$

$$= \theta M - Bex*\sin(\theta M - \phi)/(B2 + Bex*\cos(\theta M - \phi))$$

$$= \theta M - Bex/B2*\sin(\theta M - \phi)/(1 + Bex/B2*\cos(\theta M - \phi))$$

Now, C21 and C22 will be defined by the following Eqs. (17) and (18):

$$C21 = B1*(1 + Bex/B1*\cos(\theta M - \phi)) \quad (17)$$

$$C22 = B2*(1 + Bex/B2*\cos(\theta M - \phi)) \quad (18)$$

Rearranging Eq. (15) by using C21 yields the following Eq. (19):

$$\theta M - \theta 1 = Bex*\sin(\theta M - \phi)/C21 \quad (19)$$

Rearranging Eq. (16) by using C22 and substituting Eq. (19) into the rearranged equation yields the following Eq. (20):

$$\theta M - \theta 2 = Bex*\sin(\theta M - \phi)/C22 = (\theta M - \theta 1)*C21/C22 \quad (20)$$

C21/C22 will be defined as C2. Rearranging Eq. (20) by using C2 yields the following Eq. (21):

$$\theta M = (\theta 2 - C2*\theta 1)/(1 - C2) \quad (21)$$

By the definitions of C21 and C22 given by Eqs. (17) and (18), C2 can be expressed, using B1, B2, Bex, θM, and φ, as the following Eq. (22):

$$\begin{aligned}
C2 &= C21/C22 \quad (22)\\
&= B1*(1 + Bex/B1*\cos(\theta M - \phi))/\\
&\quad \{B2*(1 + Bex/B2*\cos(\theta M - \phi))\}\\
&= (B1/B2)*(1 + Bex/B1*\cos(\theta M - \phi))/\\
&\quad (1 + Bex/B2*\cos(\theta M - \phi))\\
&= C1*(1 + Bex/B1*\cos(\theta M - \phi))/\\
&\quad (1 + Bex/B2*\cos(\theta M - \phi))
\end{aligned}$$

As can be seen from Eqs. (12) and (21), the rotating field angle θM can be expressed by an equation using the angles θ1 and θ2 in either case where the effect of the second component Mex2 is ignored or not ignored. Replacing C1 in Eq. (12) with C2 yields Eq. (21). The rotating field angle θM in the case where the effect of the second component Mex2 is not ignored can thus be expressed by a similar equation to that expressing the rotating field angle θM in the case where the effect of the second component Mex2 is ignored.

Figure 4:
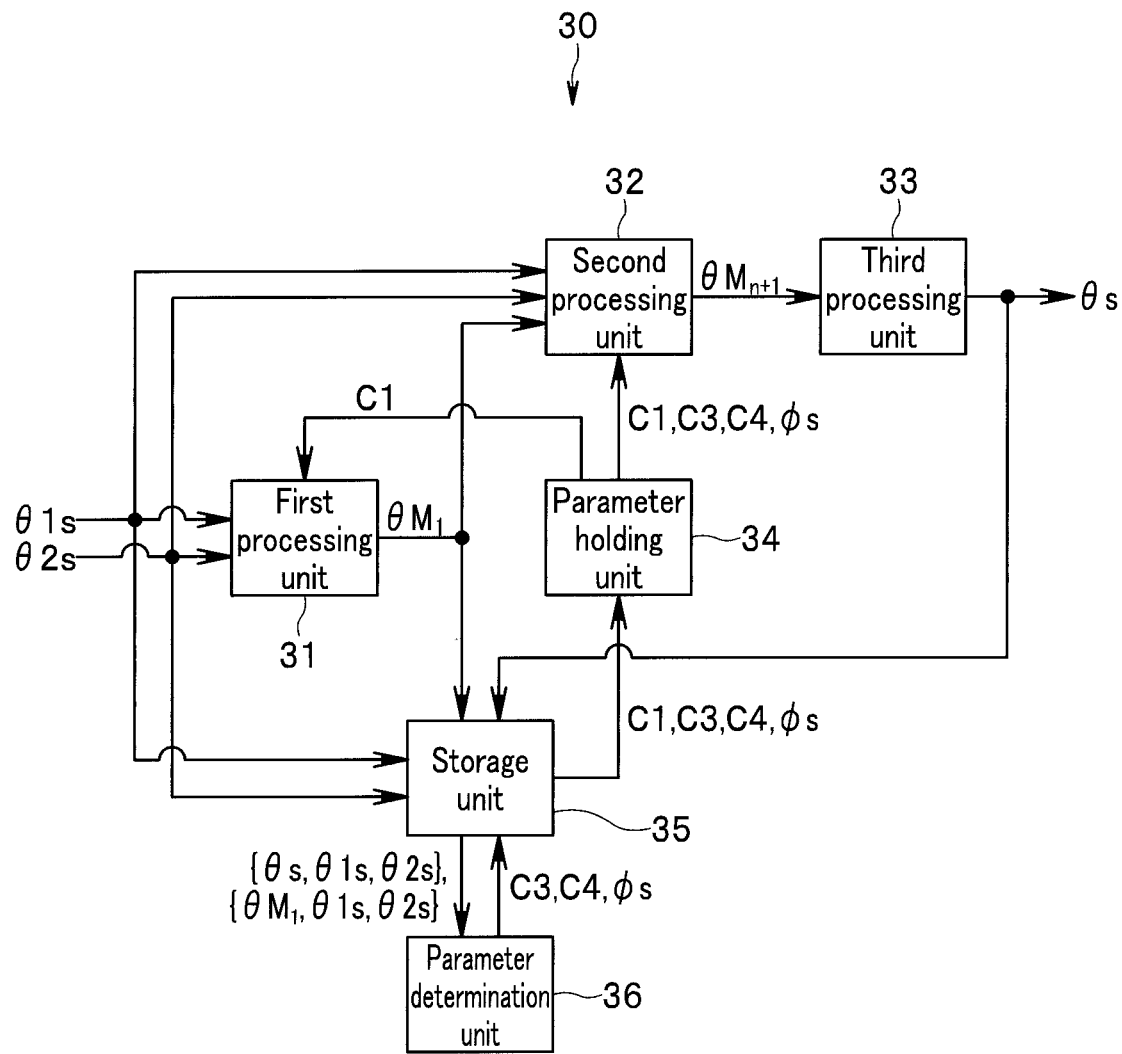
FIG. 4 is a block diagram illustrating the configuration of a processor according to the embodiment of the invention.

Next, the configuration of the processor 30 and the method for generating the angle detection value θs will be specifically described. As shown in FIG. 4, the processor 30 includes a first processing unit 31, a second processing unit 32, a third processing unit 33, a parameter holding unit 34, a storage unit 35, and a parameter determination unit 36. The parameter holding unit 34 and the storage unit 35 may be implemented by a storage element or elements included in an ASIC or microcomputer constituting the processor 30. The parameter holding unit 34 and the storage unit 35 may be implemented by a storage element or elements separate from the ASIC or microcomputer.

Figure 9:
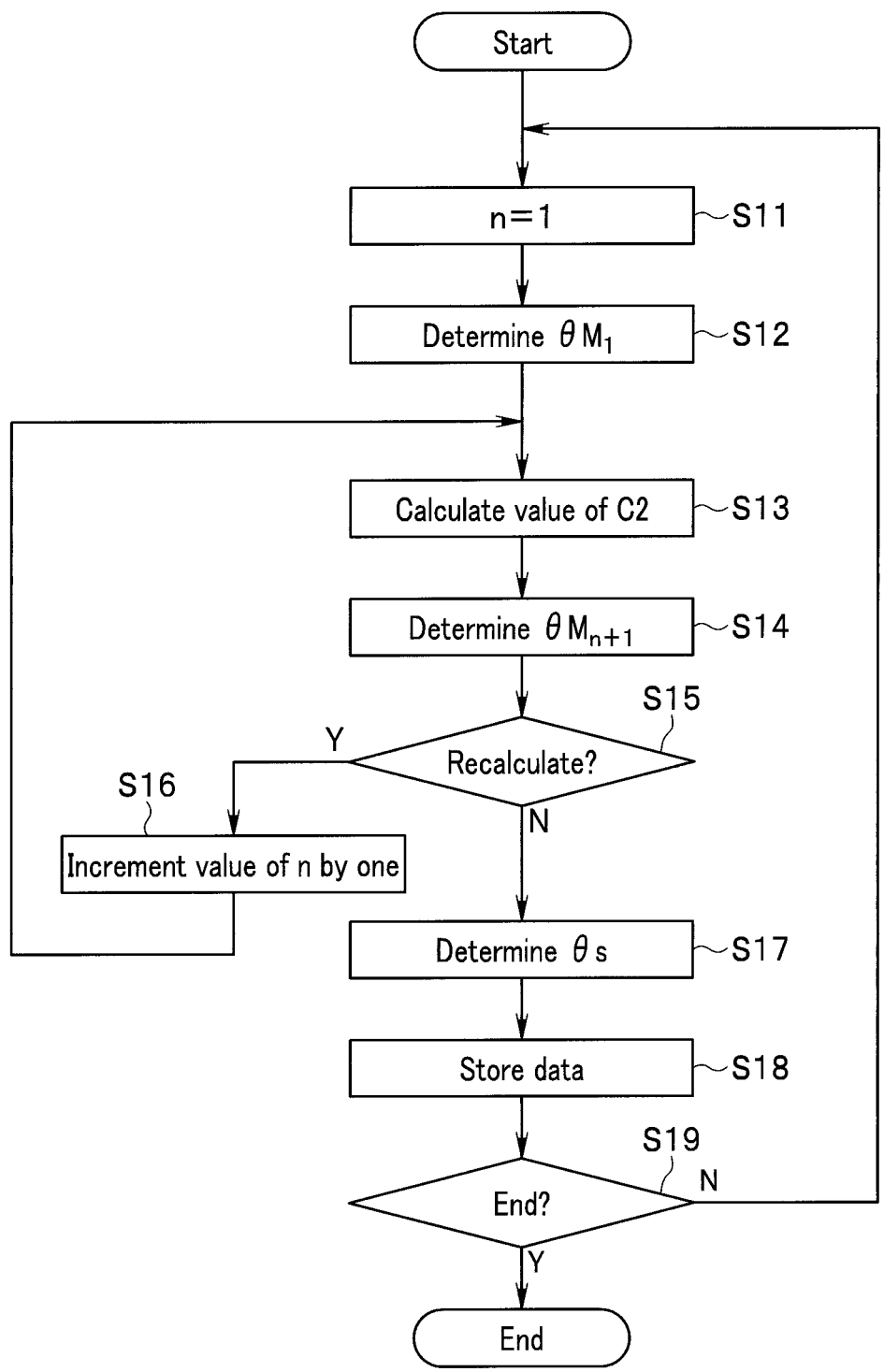
FIG. 9 is a flowchart showing angle detection value generation processing of the embodiment of the present invention.

The processor 30 performs angle detection value generation processing for generating the angle detection value θs and function determination processing for determining predetermined functions used in the angle detection value generation processing. The angle detection value generation processing and the function determination processing are performed independently of each other. The angle detection value generation processing will initially be described with reference to FIG. 9. FIG. 9 is a flowchart showing the angle detection value generation processing. In the following description, suppose that the magnet 6 continues to rotate in one direction.

In the angle detection value generation processing, in step S11, the first processing unit 31 initially defines n as an integer of 1 or more, and assumes n=1.

In step S12, the first processing unit 31 performs first processing for determining a first candidate value $\theta M_1$ of the angle detection value θs by performing first computing processing. The first computing processing uses at least one first signal, i.e., the first initial angle detection value θ1s, at least one second signal, i.e., the second initial angle detection value θ2s, and the first and second strengths B1 and B2. In particular, in the present embodiment, the first computing processing is processing for calculating the candidate value $\theta M_1$ by substituting the first and second initial angle detection values θ1s and θ2s and the ratio of the first strength B1 of the first partial magnetic field MFa to the second strength B2 of the second partial magnetic field MFb into a first function for determining the angle detection value θs. Specifically, for example, the first processing unit 31 calculates $\theta M_1$ by the following Eq. (23):

$$\theta M_1 = (\theta 2s - C1 * \theta 1s)/(1-C1) \quad (23)$$

Eq. (23) is obtained by replacing "θM", "θ1", and "θ2" in Eq. (12) with "$\theta M_1$", "θ1s", and "θ2s", respectively. The right-hand side of Eq. (23) corresponds to the first function. In Eq. (23), C1 represents the ratio of the first strength B1 to the second strength B2, or B1/B2. The value of C1 is held in the parameter holding unit 34. The first processing unit 31 obtains the first initial angle detection value θ1s by obtaining the first signal from the first magnetic sensor 10, obtains the second initial angle detection value θ2s by obtaining the second signal from the second magnetic sensor 20, and obtains the value of C1 from the parameter holding unit 34. The first processing unit 31 then performs the first processing by using the obtained first and second initial angle detection values θ1s and θ2s and the value of C1.

In the angle detection value generation processing, the second processing unit 32 then performs second processing. The second processing includes performing processing for determining an (n+1)th candidate value $\theta M_{n+1}$ (hereinafter, referred to as candidate value determination processing) either once or more than once while incrementing the value of n by one each time. In the candidate value determination processing, the (n+1)th candidate value $\theta M_{n+1}$ is determined by performing second computing processing using at least one first signal, i.e., the first initial angle detection value θ1s, at least one second signal, i.e., the second initial angle detection value θ2s, the first and second strengths B1 and B2, and an nth candidate value $\theta M_n$ of the angle detection value θs. Steps S13, S14, S15, and S16 correspond to the second processing.

The candidate value determination processing will be described in detail below. Steps S13 and S14 correspond to the candidate value determination processing. In step S13, the second processing unit 32 initially performs processing for calculating the value of C2 by the following Eq. (24):

$$C2 = C1*(1+C3*\cos(\theta M_n - \phi s))/(1+C4*\cos(\theta M_n - \phi s)) \quad (24)$$

Eq. (24) is obtained by replacing "Bex/B1", "Bex/B2", "θM", and "φ" in Eq. (22) with "C3", "C4", "$\theta M_n$", and "φs", respectively. The right-hand side of Eq. (24) except C1 is a coefficient expressed by an equation using the candidate value $\theta M_n$ of the angle detection value θs and at least one parameter. This coefficient will hereinafter be denoted by the symbol C2a. C3 is a first parameter representing the ratio of the strength Bex of the noise magnetic field Mex to the first strength B1, or Bex/B1. C4 is a second parameter representing the ratio of the strength Bex of the noise magnetic field Mex to the second strength B2, or Bex/B2. φs is a third parameter representing the angle φ that the direction of the noise magnetic field Mex forms with respect to the reference direction DR. The values of the first to third parameters C3, C4, and φs are held in the parameter holding unit 34.

At the first round of the candidate value determination processing, i.e., processing for determining a candidate value $\theta M_2$, the first candidate value $\theta M_1$ calculated by the first processing unit 31 is used as $\theta M_n$ in Eq. (24). In the processing for determining the candidate value $\theta M_2$, the second processing unit 32 obtains the candidate value $\theta M_1$ from the first processing unit 31 and the values of C1, C3, C4, and φs from the parameter holding unit 34. The second processing unit 32 then performs processing for calculating the value of C2 by using the obtained candidate value $\theta M_1$ and the values of C1, C3, C4, and φs.

At the point in time when the second processing unit 32 performs the candidate value determination processing for the second or subsequent round, the candidate value $\theta M_n$ determined in the immediately previous round of the candidate value determination processing is held in the second processing unit 32. At the second or subsequent round of the candidate value determination processing, the candidate value $\theta M_n$ held in the second processing unit 32 is used as θMn in Eq. (24). At the second or subsequent round of the candidate value determination processing, the second processing unit 32 obtains the values of C1, C3, C4, and φs from the parameter holding unit 34, and performs the processing for calculating the value of C2 by using the obtained values of C1, C3, C4, and φs, and the candidate value $\theta M_n$ held in the second processing unit 32.

In step S14, the second processing unit 32 performs processing for determining the candidate value $\theta M_{n+1}$ by the following Eq. (25):

$$\theta M_{n+1} = (\theta 2s - C2 * \theta 1s)/(1-C2) \quad (25)$$

Eq. (25) is obtained by replacing "θM", "θ1", and "θ2" in Eq. (21) with "$\theta M_{n+1}$", "θ1s", and "θ2s", respectively. In step S14, the same first and second initial angle detection values θ1s and θ2s as those used in the first computing processing (step S12) are used. For example, the second processing unit 32 may obtain the first and second initial angle detection values θ1s and θ2s by obtaining the first and second signals from the first and second magnetic sensors 10 and 20 at a specific timing. The specific timing here refers to the same timing or almost the same timing as when the first processing unit 31 obtains the first and second initial angle detection values θ1s and θ2s to perform the first computing processing (step S12). The second processing unit 32 holds the obtained first and second initial angle detection values θ1s and θ2s.

In step S14, the second processing unit 32 performs the processing for determining the candidate value $\theta M_{n+1}$ by using the first and second initial angle detection values θ1s and θ2s held in the second processing unit 32 and the value of C2 calculated in step S13. The candidate value $\theta M_{n+1}$ is determined by the execution of steps S13 and S14. The second processing unit 32 holds the determined candidate value $\theta M_{n+1}$.

The series of processes for calculating the candidate value $\theta M_{n+1}$ in steps S13 and 14 corresponds to the second computing processing mentioned above. In particular, in the present embodiment, the second computing processing is processing for calculating the candidate value $\theta M_{n+1}$ by substituting the first and second initial angle detection values θ1s and θ2s, the ratio of the first strength B1 to the second strength B2, and the candidate value $\theta M_n$ into a second function for determining the angle detection value θs. An equation obtained by substituting Eq. (24) into C2 in the right-hand side of Eq. (25) corresponds to the second function. In Eq. (24), C1 represents the ratio of the first strength B1 to the second strength B2, or B1/B2. The second function includes the coefficient C2a expressed by an equation using the candidate value $\theta M_n$ of the angle detection value θs and the first to third parameters C3, C4, and φs (see Eq. (24)).

In step S15, the second processing unit 32 determines whether to recalculate the candidate value $\theta M_{n+1}$. When performing the candidate value determination processing only once, the second processing unit 32 determines to not recalculate the candidate value $\theta M_{n+1}$. When performing the candidate value determination processing twice or more, for example, the second processing unit 32 may determine to recalculate the candidate value $\theta M_{n+1}$ if n is less than a predetermined value. The second processing unit 32 may determine to not recalculate the candidate value $\theta M_{n+1}$ if n reaches the predetermined value. If the candidate value $\theta M_{n+1}$ is determined to be recalculated (Y), the second processing unit 32 increments the value of n by one (step S16). The processing returns to step S13. If the candidate value $\theta M_{n+1}$ is determined to not be recalculated (N), the second processing unit 32 ends the candidate value determination processing. The second processing ends with the end of the candidate value determination processing.

After the end of the second processing, in step S17 of the angle detection value generation processing, the third processing unit 33 performs third processing for determining the candidate value $\theta M_{n+1}$ last determined in the second processing to be the angle detection value θs.

In step S18, the storage unit 35 performs processing for storing, as a set of data, the angle detection value θs and the first and second initial angle detection values θ1s and θ2s used in generating the angle detection value θs. For example, the storage unit 35 may store the data in the following manner. The storage unit 35 initially obtains the first and second initial angle detection values θ1s and θ2s by obtaining the first and second signals from the first and second magnetic sensors 10 and 20 at a specific timing, and holds the obtained first and second initial angle detection values θ1s and θ2s. The specific timing here refers to the same timing or almost the same timing as when the first processing unit 31 obtains the first and second initial angle detection values θ1s and θ2s to perform the first computing processing (step S12). Then, after the end of the third processing (step S17), the storage unit 35 obtains the angle detection value θs from the third processing unit 33, and stores the obtained angle detection value θs along with the held first and second initial angle detection values θ1s and θ2s, as a set of data.

In step S19, the processor 30 determines whether to end the angle detection value generation processing. If, in step S19, the angle detection value generation processing is determined to be ended (Y), the processor 30 ends the angle detection value generation processing. For example, the processor 30 ends the angle detection value generation processing if an end-instructing signal is input to the processor 30. If, in step S19, the angle detection value generation processing is determined to not be ended (N), the processing returns to step S11.

Figure 10:
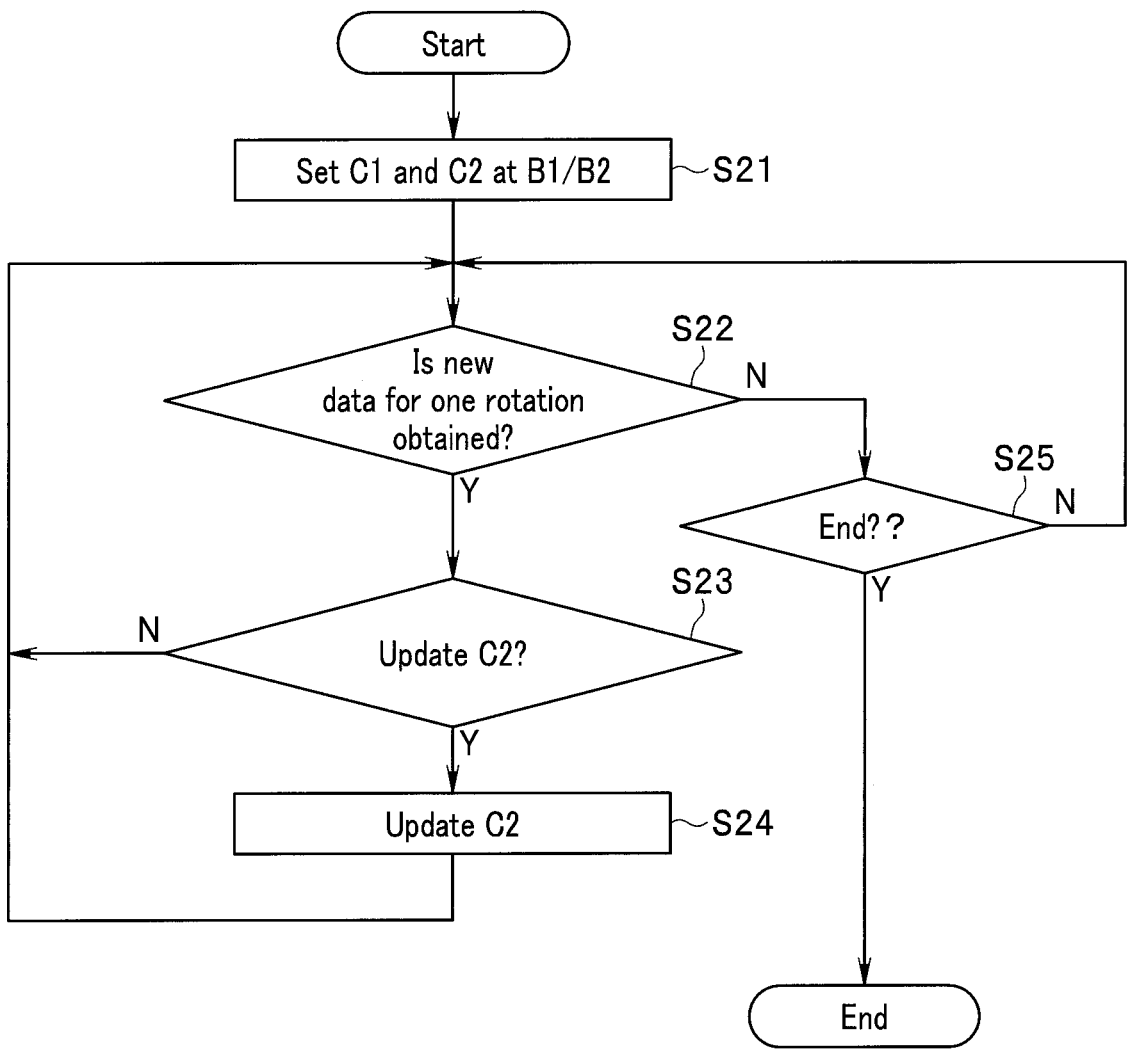
FIG. 10 is a flowchart showing function determination processing of the embodiment of the present invention.

Next, the function determination processing will be described with reference to FIG. 10. FIG. 10 is a flowchart showing the function determination processing. The function determination processing is processing for determining the first function used in the first computing processing (step S12 in FIG. 9) and the second function used in the second computing processing (steps S13 and S14 in FIG. 9).

In the function determination processing, in step S21, the parameter holding unit 34 initially sets C1 in Eqs. (23) and (24) and C2 in Eq. (24) at the ratio of the first strength B1 of the first partial magnetic field MFa to the second strength B2 of the second partial magnetic field MFb, or B1/B2. The value of B1/B2 is determined depending on the positional relationship between the first and second detection positions P1 and P2, and remains unchanged regardless of the value of the rotating field angle θM. The value of B1/B2 can be determined by measuring the first and second strengths B1 and B2. The first and second strengths B1 and B2 are measured by a not-shown control unit outside the angle sensor 1 before shipment or use of the angle sensor 1. The first and second strengths B1 and B2 may be measured by using the first and second magnetic sensors 10 and 20, or by using other magnetic sensors. The value of B1/B2 is stored in the storage unit 35.

Specifically, the parameter holding unit 34 reads the value of B1/B2 from the storage unit 35 and holds the read value as the value of C1, whereby C1 can be set at B1/B2. The parameter holding unit 34 also holds the values of C3 and C4 as 0. This can substantially set C2 at B1/B2 (see Eq. (24)). The first function is determined by setting C1 at B1/B2.

In step S22, the parameter determination unit 36 performs processing for determining whether new data for one rotation is obtained. Data for one rotation refers to data including a plurality of pairs of first and second initial angle detection values θ1s and θ2s obtained when the direction of the magnetic field to be detected makes one rotation in a predetermined direction of rotation (when the rotating field angle θM changes by 360°) and a plurality of angle detection values θs corresponding to the plurality of pairs. Such processing is performed by the parameter determination unit 36 checking the data stored in the storage unit 35.

If, in step S22, new data for one rotation is determined to be obtained (Y), the parameter determination unit 36 determines whether to update C2, or more specifically, whether to update the equation expressing C2 (Eq. 24) (step S23). For example, the parameter determination unit 36 determines whether to update C2 on the basis of the number of times the angle determination value θs has been generated or the time elapsed since the previous update of the coefficient. If C2 is determined to not be updated (N), the processing returns to step S22.

In step S23, if C2 is determined to be updated (Y), the parameter determination unit 36 performs update processing for updating C2 (step S24). In the update processing, the parameter determination unit 36 initially obtains the latest data for one rotation from the storage unit 35. In FIG. 4, {θs, θ1s, θ2s} represents data for one rotation. Next, the parameter determination unit 36 calculates the values of the first to third parameters C3, C4, and φs by using the obtained data for one rotation. Methods for calculating the values of the first to third parameters C3, C4, and φs will be described later.

The parameter determination unit 36 then stores the determined values of the first to third parameters C3, C4, and φs into the storage unit 35. The parameter holding unit 34 then reads the values of the first to third parameters C3, C4, and φs from the storage unit 35 and holds the values. This can substantially update the equation expressing C2 (Eq. (24)). The second function is determined by the update of C2. After the end of the update processing, the processing returns to step S22.

If, in step S22, new data for one rotation is determined to not be obtained (N), the processor 30 determines whether to end the function determination processing (step S25). If, in step S25, the function determination processing is determined to be ended (Y), the processor 30 ends the function determination processing. For example, the processor 30 ends the function determination processing if an end-instructing signal is input to the processor 30. If, in step S25, the function determination processing is determined to not be ended (N), the processing returns to step S21.

Next, the methods for calculating the values of the first to third parameters C3, C4, and φs will be described. The method for calculating the values of the first and second parameters C3 and C4 will initially be described. The first parameter C3 represents Bex/B1, i.e., the ratio of the strength Bex of the noise magnetic field Mex to the first strength B1 of the first partial magnetic field MFa. Substituting Eqs. (5) and (6) into Eq. (13) to which the foregoing atan(x) approximation is applied yields the following Eq. (26):

$$\varepsilon1 = Bex^* \sin(\theta M - \phi)/(B1 + Bex^* \cos(\theta M - \phi)) \quad (26)$$

If θM−φ, is π/2, the right-hand side of Eq. (26) becomes Bex/B1, i.e., C3. If θM−φ is π/2, ε1 has a maximum value. The maximum value of ε1 can thus be assumed as the value of C3. In the present embodiment, the value of C3 is determined by assuming the maximum value of θs−θ1s as the maximum value of θM−θ1, i.e., the maximum value of ε1.

The second parameter C4 represents Bex/B2, i.e., the ratio of the strength Bex of the noise magnetic field Mex to the second strength B2 of the second partial magnetic field MFb. Substituting Eqs. (5) and (6) into Eq. (14) to which the foregoing atan(x) approximation is applied yields the following Eq. (27):

$$\varepsilon2 = Bex^* \sin(\theta M - \phi)/(B2 + Bex^* \cos(\theta M - \phi)) \quad (27)$$

If θM−φ is π/2, the right-hand side of Eq. (27) becomes Bex/B2, i.e., C4. If θM−φ is π/2, ε2 has a maximum value. The maximum value of ε2 can thus be assumed as the value of C4. In the present embodiment, the value of C4 is determined by assuming the maximum value of θs−θ2s as the maximum value of θM−θ2, i.e., the maximum value of ε2.

Specifically, the parameter determination unit 36 determines the values of the first and second parameters C3 and C4 in the following manner. The parameter determination unit 36 initially obtains data for one rotation from the storage unit 35. The parameter determination unit 36 then determines the waveform of θs−θ1s and the waveform of θs−θ2s, both of which change depending on θs, by using the obtained data for one rotation. The parameter determination unit 36 then determines the maximum value of θs−θ1s from the waveform of θs−θ1s, and the maximum value of θs−θ2s from the waveform of θs−θ2s. The parameter determination unit 36 assumes the maximum value of θs−θ1s as the value of C3, and the maximum value of θs−θ2s as the value of C4.

Next, the method for calculating the value of the third parameter φs will be described. If the direction of the noise magnetic field Mex coincides with those of the first and second partial magnetic fields MFa and MFb, the directions of the first composite magnetic field MF1 and the second composite magnetic field MF2 do not deviate from those of the first partial magnetic field MFa and the second partial magnetic field MFb, respectively. This makes both the angles θ1 and θ2 equal to the rotating field angle θM. In such a case, θ1s and θ2s coincide with each other. In addition, θM−φ becomes zero. θM when θ1s and θ2s coincide with each other can thus be regarded as φ. In the present embodiment, the angle detection value θs when θ1s and θ2s coincide or substantially coincide with each other is assumed as the value of φs.

Specifically, the parameter determination unit 36 determines the value of the parameter φs in the following manner. The parameter determination unit 36 initially obtains data for one rotation from the storage unit 35. The parameter determination unit 36 then determines the waveform of θ1s−θ2s, which changes depending on θs, by using the obtained data for one rotation. Next, the parameter determination unit 36 determines the differential value of θ1s−θ2s at each of a plurality of points on the waveform of θ1s−θ2s. The parameter determination unit 36 then determines θs at which θ1s−θ2s is zero or has a minimum absolute value and the differential value of θ1s−θ2s is positive. The parameter determination unit 36 assumes the determined θs as the value of φs.

θ1s and θ2s also coincide with each other if the angle that the direction of the noise magnetic field Mex forms with respect to the directions of the first and second partial magnetic fields MFa and MFb is 180°, or equivalently, θM−φ (in units of rad) is π. In the present embodiment, θM−φ is π in the case where θ1s−θ2s is zero or has a minimum absolute value and the differential value of θ1s−θ2s is negative.

The case where the processor 30 stores and uses sets of data on the angle detection value θs and the first and second initial angle detection values θ1s and θ2s in the angle detection value generation processing and the function determination processing has been described so far. However, the processor 30 may store and use sets of data on the candidate value θM₁ and the first and second initial angle detection values θ1s and θ2s in addition to the sets of data on the angle detection value θs and the first and second initial angle detection values θ1s and θ2s. In such a case, before performing the angle detection value generation processing, the processor 30 repeats the following two types of processing while rotating the direction of the magnetic field to be detected in a predetermined direction of rotation: processing for determining the candidate value θM₁ like step S12 of the angle detection value generation processing, and processing for storing, as a set of data, the candidate value θM₁ and the first and second initial angle detection values θ1s and θ2s like step S18 of the angle detection value generation processing. The two types of processing are repeated until the direction of the magnetic field to be detected makes at least one rotation in the predetermined direction of rotation (until the rotating field angle θM changes by at least) 360°. Data including a plurality of pairs of first and second initial angle detection values θ1s and θ2s and a plurality of candidate values θM₁ corresponding to the plurality of pairs is thereby obtained. In FIG. 4, {θM₁, θ1s, θ2s} represents the data including the plurality of pairs and the plurality of candidate values θM₁.

In step S22 of the function determination processing, whether new data for one rotation is obtained is determined on the basis of the data {θM₁, θ1s, θ2s} as well as the data {θs, θ1s, θ2s}. Specifically, if new data {θM₁, θ1s, θ2s} is obtained, new data for one rotation is determined to be obtained. In such a case, in step S23 of the function determination processing, the parameter determination unit 36 immediately determines to update C2. In step S24 of the function determination processing, the parameter determination unit 36 determines the values of the first to third parameters C3, C4, and φs by using the data {θM₁, θ1s, θ2s}. The foregoing description of the methods for calculating the values of the first to third parameters C3, C4, and φs applies to methods for calculating the values of the first to third parameters C3, C4, and φs by using the data {θM₁, θ1s, θ2s} if the angle detection value θs in the foregoing description is replaced with the candidate value θM₁.

Next, the operation and effect of the angle sensor 1 and the angle sensor system 100 according to the present embodiment will be described. In the present embodiment, the processing for generating the angle detection value θs includes the first processing (step S12 in FIG. 9), the second processing (steps S13 to S16 in FIG. 9), and the third processing (step S17 in FIG. 9). In the present embodiment, the candidate value determination processing (steps S13 and S14 in FIG. 9) is performed once or more, and the candidate value θM_{n+1} last determined is assumed as the angle detection value θs. At the first round of the candidate value determination processing, the candidate value θM₂ for the second round is calculated by the second computing processing using the candidate value θM₁ for the first round calculated by the first computing processing. The second computing processing is different from the first computing processing in that the candidate value θM₁ is used in addition to the first and second initial angle detection values θ1s and θ2s and the first and second strengths B1 and B2.

A difference between the angle detection value θs and the rotating field angle θM will hereinafter be referred to as an angular error of the angle detection value θs. A difference between a given candidate value and the rotating field angle θM will be referred to as an angular error of the candidate value. The use of more parameters in the second computing processing than in the first computing processing as described above can effectively reduce the angular error of the candidate value θM₂. In particular, in the present embodiment, a difference between the first computing processing and the second computing processing derives from whether the effect of the second component Mex2 of the noise magnetic field Mex is ignored. The candidate value θM₁ in the second computing processing can be said to be a parameter taking into account the effect of the second component Mex2. According to the present embodiment, the use of the candidate value θM₁, i.e., the parameter taking into account the effect of the second component Mex2 can effectively reduce the angular error of the candidate value θM₂ caused by the noise magnetic field Mex.

The foregoing description of the candidate value θM₂ also applies to candidate values θM_{n+1} for the third and subsequent round calculated by the second computing processing. According to the present embodiment, the angular error of the angle detection value θs caused by the noise magnetic field Mex can thus be effectively reduced.

Effects of the present embodiment will now be described with reference to the results of a first and second simulations. The first simulation will initially be described. In the first simulation, a model of the angle sensor system 100 was used to determine respective angular errors of θ1s, θ2s, θM₁, and θs when θ1s, θ2s, θM₁, and θs were generated in the presence of a noise magnetic field Mex having a constant direction and strength. In the first simulation, the number of times to return to step S13 after the execution of the candidate value determination processing (hereinafter, referred to as the number of repetitions) was changed to one, two, and three. The number of times the candidate value determination processing was executed is two if the number of repetitions is one. The number of times the candidate value determination processing was executed is three if the number of repetitions is two. The number of times the candidate value determination processing was executed is four if the number of repetitions is three.

In the first simulation, a magnetic flux density corresponding to the first strength B1 of the first partial magnetic field MFa is 60 mT. A magnetic flux density corresponding to the second strength B2 of the second partial magnetic field MFb is 30 mT. A magnetic flux density corresponding to the strength Bex of the noise magnetic field Mex is 10 mT. The angle φ, that the direction of the noise magnetic field Mex forms with respect to the reference direction DR is 0°.

Figure 11:
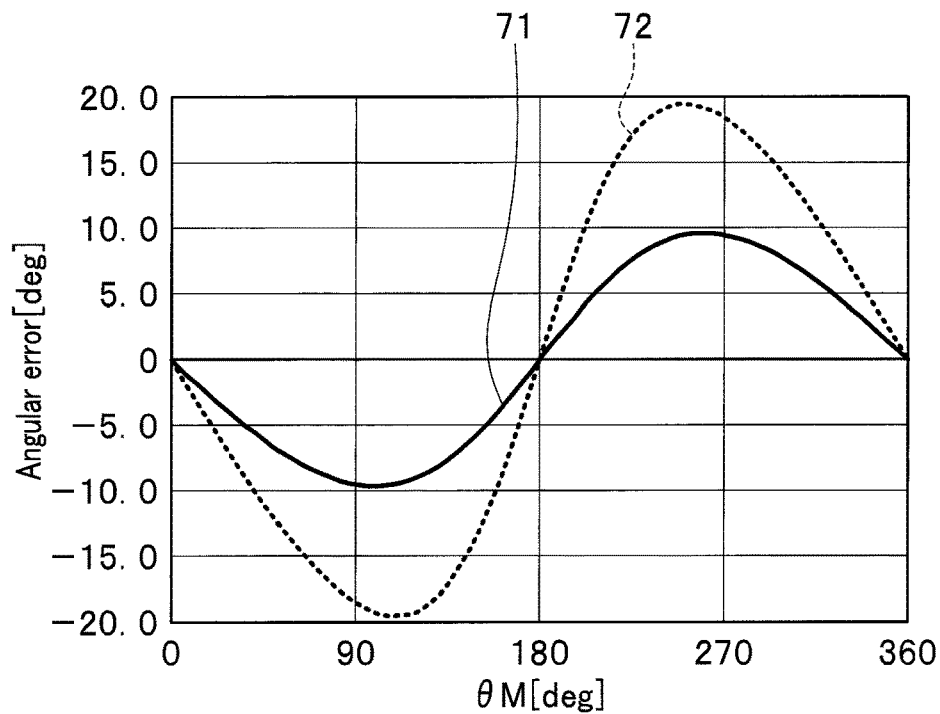
FIG. 11 is a waveform chart showing an example of waveforms of angular errors of first and second initial angle detection values obtained by a first simulation.
Figure 12:
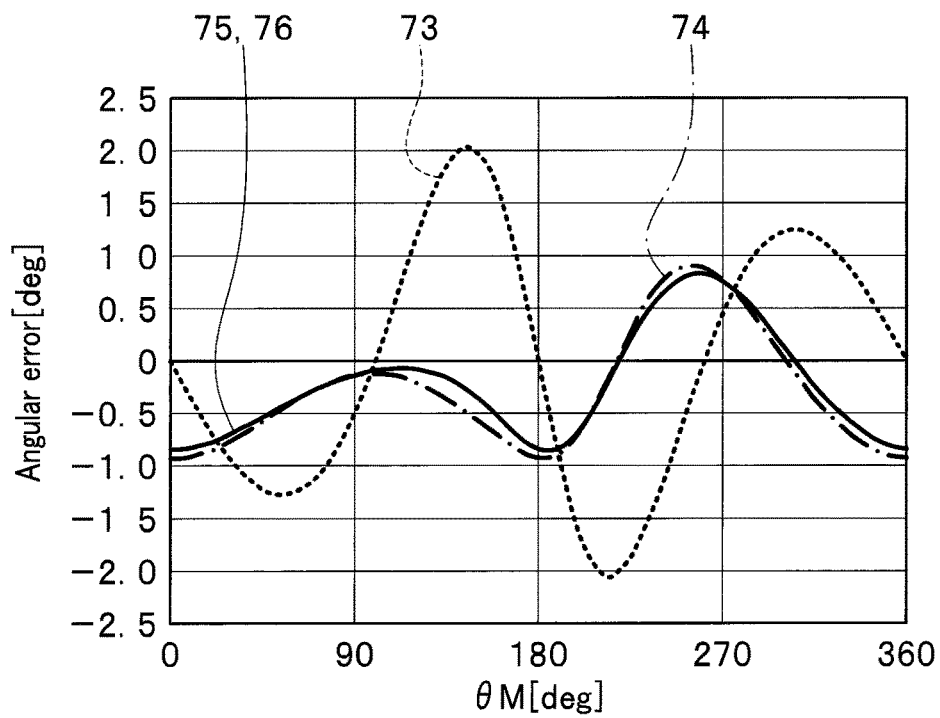
FIG. 12 is a waveform chart showing an example of waveforms of angular errors of a first candidate value and an angle detection value obtained by the first simulation.

FIG. 11 is a waveform chart showing an example of the angular errors of θ1s and θ2s obtained by the first simulation. FIG. 12 is a waveform chart showing an example of the angular errors of θM₁ and θs obtained by the first simulation. In FIGS. 11 and 12, the horizontal axis indicates the rotating field angle θM, and the vertical axis an angular error. In FIG. 11, the curve designated by the reference numeral 71 represents the angular error of θ1s, and the curve designated by the reference numeral 72 the angular error of θ2s. In FIG. 12, the curve designated by the reference numeral 73 represents the angular error of θM₁. The curve designated by the reference numeral 74 represents the angular error of θs in the case where the number of repetitions is one. The curve designated by the reference numeral 75 represents the angular error of θs in the case where the number of repetitions is two. The curve designated by the reference numeral 76 represents the angular error of θs in the case where the number of repetitions is three. In FIG. 12, the curves 75 and 76 overlap almost perfectly.

As shown in FIGS. 11 and 12, the angular errors of θs (reference numerals 74, 75, and 76) are extremely small, compared to the angular errors of θ1s and θ2s (reference numerals 71 and 72). The angular errors of θ1s and θ2s are mainly caused by the noise magnetic field Mex. The result of the first simulation shows that according to the present embodiment, the angular errors caused by the noise magnetic field Mex can be reduced.

As shown in FIG. 12, the angular errors of θs (reference numerals 74, 75, and 76) are smaller than the angular error of θM₁ (reference numeral 73). θM₁ is calculated by the first computing processing, and the angular error of θM₁ corresponds to the angular error of the angle detection value in the case where the effect of the second component Mex2 is ignored. The result of the first simulation shows that according to the present embodiment, the angular errors caused by the noise magnetic field Mex can be reduced, compared to the case where the effect of the second component Mex2 is ignored.

In the first simulation, the difference between the maximum and minimum values of the angular error was 1.90° in the case where the number of repetitions was one (reference numeral 74). The difference was 1.73° in the cases where the number of repetitions was two (reference numeral 75) and three (reference numeral 76). The result of the first simulation shows that the angular error caused by the noise magnetic field Mex can be reduced by performing the candidate value determination processing a plurality of times. From the result of the first simulation, the number of repetition is found to be preferably two or more.

Next, the second simulation will be described. The conditions of the second simulation are the same as those of the first simulation except the noise magnetic field Mex. In the second simulation, the noise magnetic field Mex is a composite magnetic field of a first noise magnetic field component having a constant direction and strength and a second noise magnetic field component assuming a three-phase alternating current motor. The magnetic flux density corresponding to the strength of the first noise magnetic field component is 10 mT. The angle that the direction of the first noise magnetic field component forms with respect to the reference direction DR is 0°.

The second noise magnetic field component is a magnetic field occurring periodically from respective inverter currents of U, V, and W phases driving a three-phase alternating current motor. The magnetic field is synchronous with the rotation of the direction of the magnetic field to be detected. The magnetic flux density corresponding to the strength of the magnetic field occurring from the inverter currents has an amplitude of 3 mT.

Figure 13:
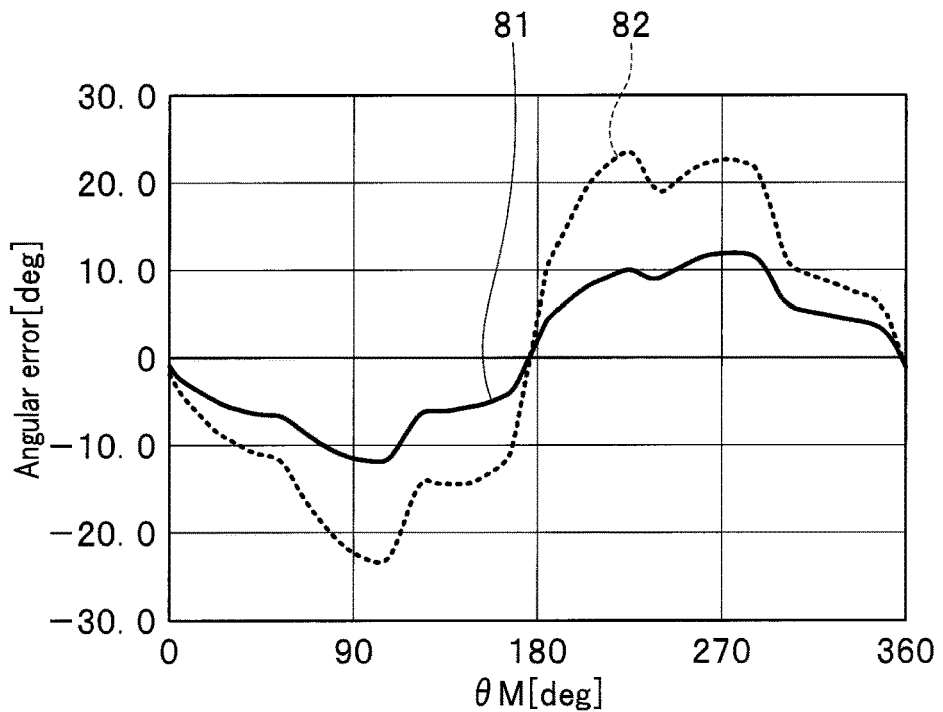
FIG. 13 is a waveform chart showing an example of waveforms of angular errors of first and second initial angle detection values obtained by a second simulation.
Figure 14:
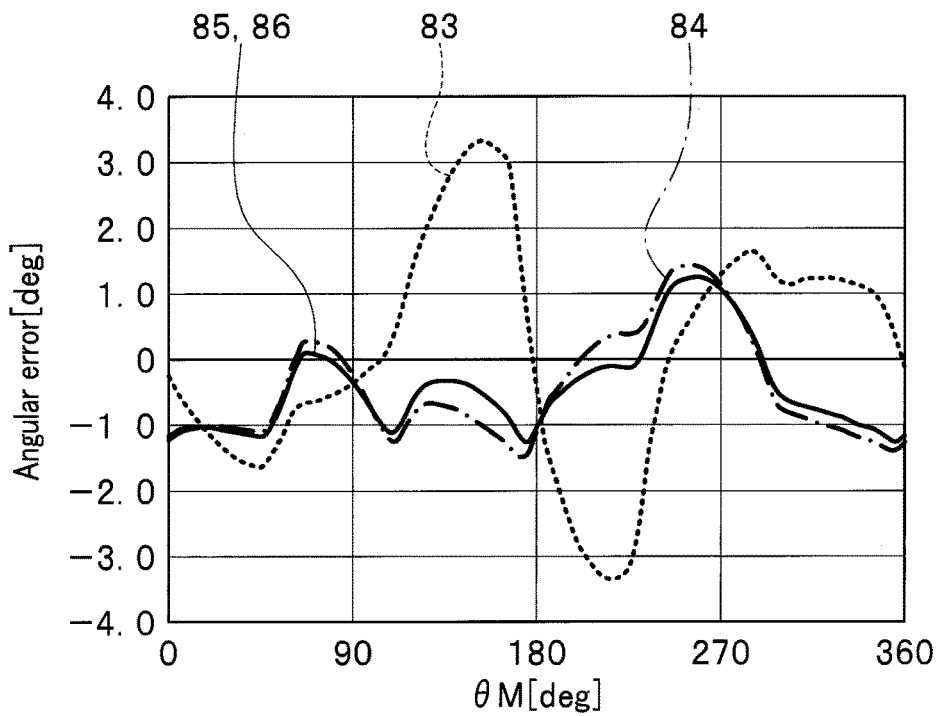
FIG. 14 is a waveform chart showing an example of waveforms of angular errors of a first candidate value and an angle detection value obtained by the second simulation.

FIG. 13 is a waveform chart showing an example of the angular errors of $\theta 1s$ and $\theta 2s$ obtained by the second simulation. FIG. 14 is a waveform chart showing an example of the angular errors of $\theta M_1$ and $\theta s$ obtained by the second simulation. In FIGS. 13 and 14, the horizontal axis indicates the rotating field angle $\theta M$, and the vertical axis an angular error. In FIG. 13, the curve designated by the reference numeral 81 represents the angular error of $\theta 1s$, and the curve designated by the reference numeral 82 the angular error of $\theta 2s$. In FIG. 14, the curve designated by the reference numeral 83 represents the angular error of $\theta M_1$. The curve designated by the reference numeral 84 represents the angular error of $\theta s$ in the case where the number of repetitions is one. The curve designated by the reference numeral 85 represents the angular error of $\theta s$ in the case where the number of repetitions is two. The curve designated by the reference numeral 86 represents the angular error of $\theta s$ in the case where the number of repetitions is three. In FIG. 14, the curves 85 and 86 overlap almost perfectly.

The result of the second simulation is similar to that of the first simulation. Specifically, as shown in FIGS. 13 and 14, the angular errors of $\theta s$ (reference numerals 84, 85, and 86) are extremely small compared to the angular errors of $\theta 1s$ and $\theta 2s$ (reference numerals 81 and 82). The result of the second simulation shows that according to the present embodiment, the angular errors caused by the noise magnetic field Mex can be reduced.

As shown in FIG. 14, the angular errors of $\theta s$ (reference numerals 84, 85, and 86) are smaller than the angular error of $\theta M_1$ (reference numeral 83). The result of the second simulation shows that according to the present embodiment, the angular errors caused by the noise magnetic field Mex can be reduced, compared to the case where the effect of the second component Mex2 is ignored.

In the second simulation, the difference between the maximum and minimum values of the angular error was 3.04° in the case where the number of repetitions is one (reference numeral 84). The difference was 2.61° in the case where the number of repetitions was two (reference numeral 85). The difference was 2.63° in the case where the number of repetitions was three (reference numeral 86). The result of the first simulation shows that the angular error caused by the noise magnetic field Mex can be reduced by performing the candidate value determination processing a plurality of times.

Next, other effects of the present embodiment will be described. As described above, according to the present embodiment, the processor 30 determines the first to third parameters C3, C4, and $\phi s$ by using the following values: a plurality of pairs of first and second initial angle detection values $\theta 1s$ and $\theta 2s$ obtained when the direction of the magnetic field to be detected makes at least one rotation in a predetermined direction of rotation, and a plurality of first candidate values $\theta M_1$ corresponding to the plurality of pairs or a plurality of angle detection values $\theta s$ corresponding to the plurality of pairs. According to the present embodiment, the accuracy of the second function used in the second computing processing can be improved by determining the first to third parameters C3, C4, and $\phi s$ repeatedly. As a result, the angular error of the angle detection value $\theta s$ can be reduced.

Modification

Figure 15:
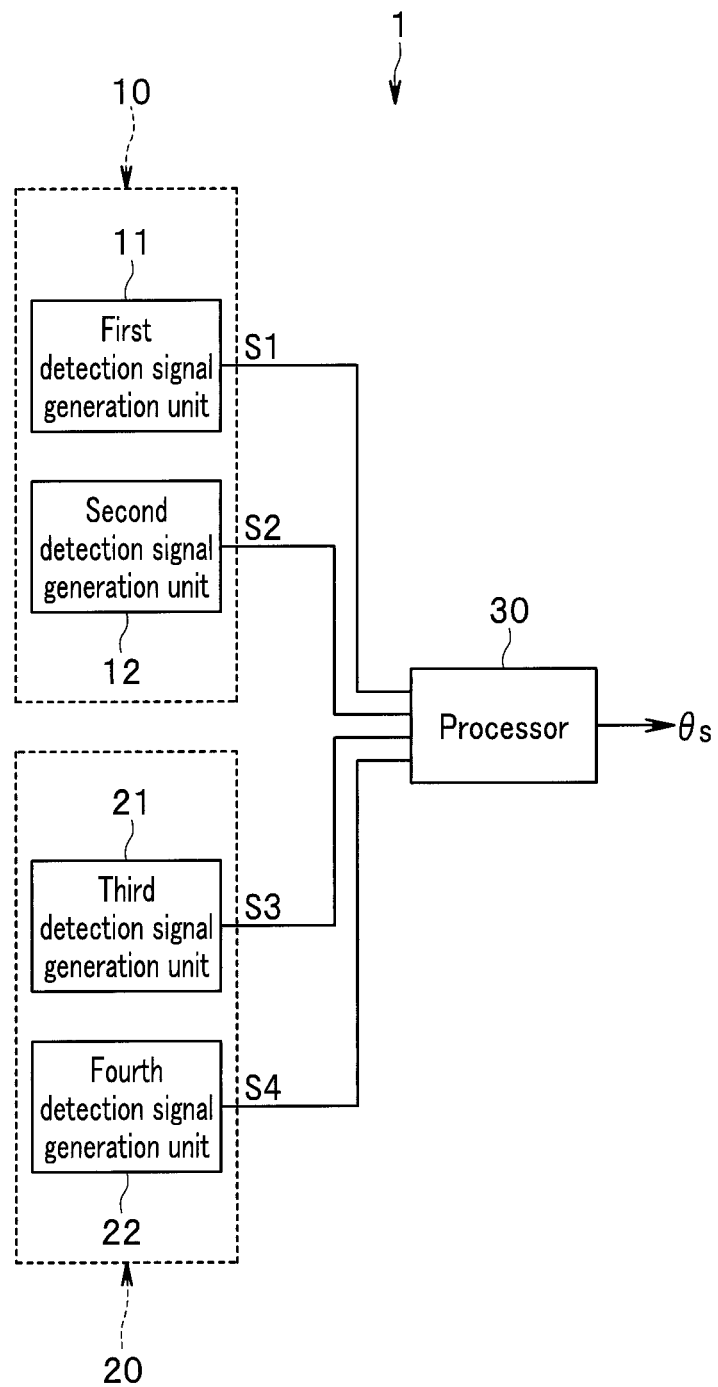
FIG. 15 is a block diagram showing a configuration of a modification of the angle sensor according to the embodiment of the present invention.
Figure 16:
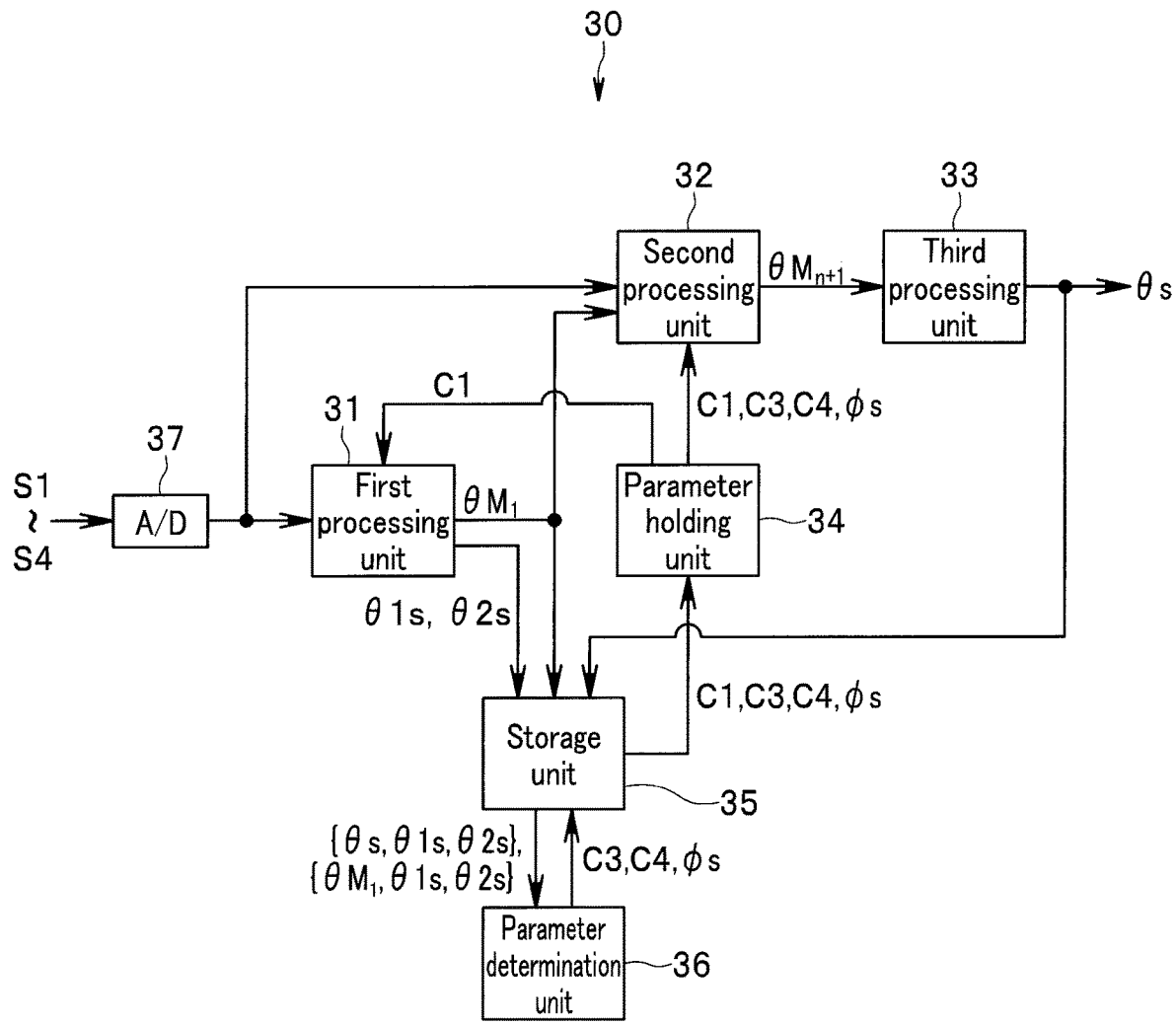
FIG. 16 is a block diagram showing a configuration of a modification of the processor of the embodiment of the present invention.

Next, a modification of the angle sensor 1 according to the present embodiment will be described. A configuration of the modification of the angle sensor 1 and a configuration of a modification of the processor 30 will initially be described with reference to FIGS. 15 and 16. FIG. 15 is a block diagram showing the configuration of the modification of the angle sensor 1. FIG. 16 is a block diagram showing the configuration of the modification of the processor 30.

As shown in FIG. 15, in the modification, the first magnetic sensor 10 does not include the A/D converters 13 and 14, and the first initial angle computing unit 15 shown in FIG. 3. In the modification, at least one first signal output from the first magnetic sensor 10 is two signals having a correspondence with the cosine and sine of the angle $\theta 1$ that the direction of the first composite magnetic field MF1 forms with respect to the reference direction DR, i.e., the first and second detection signals S1 and S2.

Similarly, in the modification, the second magnetic sensor 20 does not include the A/D converters 23 and 24, and the second initial angle computing unit 25 shown in FIG. 3. In the modification, at least one second signal output from the second magnetic sensor 20 is two signals having a correspondence with the cosine and sine of the angle $\theta 2$ that the direction of the second composite magnetic field MF2 forms with respect to the reference direction DR, i.e., the third and fourth detection signals S3 and S4.

As shown in FIG. 16, in the modification, the processor 30 includes an A/D converter 37, in addition to the first to third processing units 31 to 33, the parameter holding unit 34, the storage unit 35, and the parameter determination unit 36 shown in FIG. 4. In the modification, the first signals, i.e., first and second detection signals S1 and S2 and the second signals, i.e., third and fourth detection signals S3 and S4 are all analog signals. The A/D converter 37 converts the first to fourth detection signals S1 to S4 into digital signals.

Next, the angle detection value generation processing according to the modification will be described. In the modification, the angle detection value generation processing is different from the angle detection value generation processing described with reference to FIG. 9 in the following respects: the first processing performed by the first processing unit 31 (step S12 in FIG. 9), the processing for determining a candidate value $\theta M_{n+1}$ (step S14 in FIG. 9) in the second processing performed by the second processing unit 32, and the processing in which the storage unit 35 stores data (step S18 in FIG. 9).

The first processing according to the modification will initially be described. In the modification, the first processing unit 31 performs the first processing for determining the first candidate value $\theta M_1$ of the angle detection value $\theta s$ by performing the first computing processing using the first to fourth detection signals S1 to S4 and the first and second strengths B1 and B2.

In particular, in the modification, the first processing unit 31 initially performs, in the first processing, the following two types of processing: processing for determining the first initial angle detection value $\theta 1s$ by using the first and second detection signals S1 and S2 digitally converted by the A/D converter 37, and processing for determining the second initial angle detection value $\theta 2s$ by using the third and fourth detection signals S3 and S4 digitally converted by the A/D converter 37. The method for calculating the first initial angle detection value $\theta 1s$ is the same as that for calculating the first initial angle detection value $\theta 1s$ by the first initial angle computing unit 15 described with reference to Eq. (1). The method for calculating the second initial angle detection value $\theta 2s$ is the same as that for calculating the second initial angle detection value $\theta 2s$ by the second initial angle computing unit 25 described with reference to Eq. (2).

Next, the first processing unit 31 performs processing for calculating the candidate value $\theta M_1$ by substituting the first and second initial angle detection values $\theta 1s$ and $\theta 2s$ and the ratio of the first strength B1 of the first partial magnetic field MFa to the second strength B2 of the second partial magnetic field MFb into the first function for determining the angle detection value $\theta s$. Specifically, the first processing unit 31 calculates $\theta M_1$ by the foregoing Eq. (23). This completes the first processing.

Next, the processing for determining the candidate value $\theta M_{n+1}$ according to the modification will be described. In the modification, the second processing unit 32 then performs second processing. The second processing includes performing candidate value determination processing for determining an (n+1)th candidate value $\theta M_{n+1}$ either once or more than once while incrementing the value of n by one each time. In the candidate value determination processing, the (n+1)th candidate value $\theta M_{n+1}$ is determined by performing second computing processing using the first to fourth detection signals S1 to S4, the first and second strengths B1 and B2, and an nth candidate value $\theta M_n$ of the angle detection value $\theta s$. The processing content of the second processing other than the processing for determining the candidate value $\theta M_{n+1}$ is the same as that described with reference to FIG. 9.

In the processing for determining the candidate value $\theta M_{n+1}$ according to the modification, like the first processing according to the modification, the second processing unit 32 initially performs processing for determining the first and second initial angle detection values $\theta 1s$ and $\theta 2s$. The processing for determining the first and second initial angle detection values $\theta 1s$ and $\theta 2s$ uses the same first to fourth detection signals S1 to S4 as those used in determining the first and second initial angle detection values $\theta 1s$ and $\theta 2s$ in the first processing according to the modification. For example, the second processing unit 32 may obtain the first to fourth detection signals S1 to S4 from the A/D converter 37 at a specific timing. The specific timing here refers to the same timing or almost the same timing as when the first processing unit 31 obtains the first to fourth detection signals S1 to S4 to perform the processing for determining the first and second initial angle detection values $\theta 1s$ and $\theta 2s$. The second processing unit 32 holds the obtained first to fourth detection signals S1 to S4. In the processing for determining the candidate value $\theta M_{n+1}$, the second processing unit 32 performs processing for determining the first and second initial angle detection values $\theta 1s$ and $\theta 2s$ by using the first to fourth detection signals S1 to S4 held by the second processing unit 32.

Next, the second processing unit 32 determines the candidate value $\theta M_{n+1}$ by the foregoing Eq. (25). This completes the processing for determining the candidate value $\theta M_{n+1}$.

Next, the processing where the storage unit 35 stores data according to the modification will be described. The storage unit 35 performs processing for storing an angle detection value $\theta s$ and first and second initial angle detection values $\theta 1s$ and $\theta 2s$ used in generating the angle detection value $\theta s$ as a set of data. For example, the storage unit 35 may store the data in the following manner. Initially, after the execution of the processing for determining the first and second initial angle detection values $\theta 1s$ and $\theta 2s$ by the first processing unit 31, the storage unit 35 obtains the first and second initial angle detection values $\theta 1s$ and $\theta 2s$ from the first processing unit 31. The storage unit 35 holds the obtained first and second initial angle detection values $\theta 1s$ and $\theta 2s$. Then, after the execution of the third processing (step S17 in FIG. 9) by the third processing unit 33, the storage unit 35 obtains the angle detection value $\theta s$ from the third processing unit 33. The storage unit 35 stores the obtained angle detection value $\theta s$ along with the held first and second initial angle detection values $\theta 1s$ and $\theta 2s$ as a set of data.

The rest of the content of the angle detection value generation processing according to the modification is the same as that of the angle detection value generation processing described with reference to FIG. 9.

The present invention is not limited to the foregoing embodiment, and various modifications may be made thereto. For example, the processor 30 may determine C1 by using the following values: a plurality of pairs of first and second initial angle detection values $\theta 1s$ and $\theta 2s$ generated when the direction of the magnetic field to be detected makes at least one rotation in a predetermined direction of rotation, and a plurality of first candidate values $\theta M_1$ corresponding to the plurality of pairs or a plurality of angle detection values $\theta s$ corresponding to the plurality of pairs. As described above, the first parameter C3 represents Bex/B1, and the second parameter C4 represents Bex/B2. C4/C3 thus yields B1/B2, i.e., C1. After the calculation of the values of the first and second parameters C3 and C4, the processor 30 may determine the value of C4/C3 and hold the determined value as the value of C1. The parameter holding unit 34 may hold an initial value of C1 before the calculation of the values of the first and second parameters C3 and C4. The initial value of C1 may be B1/B2 determined from the actual measurements of the first and second strengths B1 and B2, or B1/B2 determined by a simulation.

In the present invention, the configuration of the processor 30 is not limited to the examples described in the embodiment, and the processor 30 may have any configuration as long as the requirements set forth in the claims are satisfied. For example, in a modification, the processor 30 may further include a computing unit similar to the first and second initial angle computing units 15 and 25 shown in FIG. 3. This computing unit determines first and second initial angle detection values θ1s and θ2s by performing computing using the first to fourth detection signals S1 to S4 digitally converted by the A/D converter 37. The first processing unit 31 may perform first processing similar to that of step S12 in FIG. 9 by using the first and second initial angle detection values θ1s and θ2s calculated by the computing unit. The second processing unit 32 may perform similar processing for determining a candidate value $\theta M_{n+1}$ to that of step S14 in FIG. 9 by using the first and second initial angle detection values θ1s and θ2s calculated by the computing unit. The storage unit 35 may perform similar processing for storing data to that of step S18 in FIG. 9 by using the first and second initial angle detection values θ1s and θ2s calculated by the computing unit.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiment.

What is claimed is:

1. An angle sensor configured to generate an angle detection value having a correspondence with an angle to be detected, the angle sensor comprising:
a first magnetic sensor that detects a first composite magnetic field at a first detection position, and outputs at least one first signal having a correspondence with an angle that a direction of the first composite magnetic field forms with respect to a reference direction, the first composite magnetic field being a composite magnetic field of a magnetic field to be detected and a noise magnetic field other than the magnetic field to be detected;
a second magnetic sensor that detects a second composite magnetic field at a second detection position different from the first detection position, and outputs at least one second signal having a correspondence with an angle that a direction of the second composite magnetic field forms with respect to the reference direction, the second composite magnetic field being a composite magnetic field of the magnetic field to be detected and the noise magnetic field; and
a processor that obtains the at least one first signal and the at least one second signal, and performs processing for generating the angle detection value, wherein
at the first and second detection positions, a direction of the magnetic field to be detected changes with the angle to be detected,
the magnetic field to be detected has a first strength at the first detection position,
the magnetic field to be detected has a second strength different from the first strength at the second detection position, and
the processing for generating the angle detection value includes
first processing for determining a first candidate value of the angle detection value by performing first computing processing using the at least one first signal, the at least one second signal, and the first and second strengths,
second processing for performing processing for determining an (n+1)th candidate value either once or more than once while incrementing n in value by one each time until n reaches a predetermined value, the (n+1)th candidate value being determined by performing second computing processing using the at least one first signal, the at least one second signal, the first and second strengths, and an nth candidate value of the angle detection value, where n is an integer of 1 or more, and
third processing for determining, when the second processing ends upon determining a last candidate value when n reaches the predetermined value, the angle detection value to be the last candidate value determined by the second processing.

2. The angle sensor according to claim 1, wherein:
the at least one first signal is a signal including information about a first initial angle detection value indicating the angle that the direction of the first composite magnetic field forms with respect to the reference direction; and
the at least one second signal is a signal including information about a second initial angle detection value indicating the angle that the direction of the second composite magnetic field forms with respect to the reference direction.

3. The angle sensor according to claim 2, wherein the first computing processing is processing for calculating the first candidate value by substituting the first and second initial angle detection values and a ratio of the first strength to the second strength into a first function for determining the angle detection value.

4. The angle sensor according to claim 2, wherein the second computing processing is processing for calculating the (n+1)th candidate value by substituting the first and second initial angle detection values, a ratio of the first strength to the second strength, and the nth candidate value into a second function for determining the angle detection value.

5. The angle sensor according to claim 4, wherein the second function includes a coefficient expressed by an equation using the nth candidate value of the angle detection value and at least one parameter.

6. The angle sensor according to claim 5, wherein the at least one parameter includes a first parameter representing a ratio of a strength of the noise magnetic field to the first strength, a second parameter representing a ratio of the strength of the noise magnetic field to the second strength, and a third parameter representing an angle that a direction of the noise magnetic field forms with respect to the reference direction.

7. The angle sensor according to claim 5, wherein the processor determines the at least one parameter by using a plurality of pairs of the first and second initial angle detection values obtained when the direction of the magnetic field to be detected makes at least one rotation in a predetermined direction of rotation, and a plurality of the first candidate values corresponding to the plurality of pairs or a plurality of the angle detection values corresponding to the plurality of pairs.

8. The angle sensor according to claim 1, wherein:
the at least one first signal includes two signals having a correspondence with a cosine and a sine of the angle that the direction of the first composite magnetic field forms with respect to the reference direction; and
the at least one second signal includes two signals having a correspondence with a cosine and a sine of the angle that the direction of the second composite magnetic field forms with respect to the reference direction.

9. An angle sensor system comprising:
the angle sensor according to claim 1; and
a magnetic field generation unit for generating the magnetic field to be detected,
wherein the first and second detection positions are at mutually different distances from the magnetic field generation unit.

10. The angle sensor system according to claim 9, wherein the first and second of detection positions are mutually different positions on an imaginary straight line passing through the magnetic field generation unit.

* * * * *